United States Patent
Cylvick

(10) Patent No.: US 8,333,155 B2
(45) Date of Patent: Dec. 18, 2012

(54) TRIM CONTROLLED, DYNAMICALLY CONTROLLABLE, TROLLEY BRAKE

(75) Inventor: Eric C. Cylvick, Wanship, UT (US)

(73) Assignee: Zipholdings, LLC., Wanship, UT (US)

( * ) Notice: Subject to any disclaimer, the term of this patent is extended or adjusted under 35 U.S.C. 154(b) by 213 days.

(21) Appl. No.: 12/791,782

(22) Filed: Jun. 1, 2010

(65) Prior Publication Data

US 2010/0300322 A1 Dec. 2, 2010

Related U.S. Application Data

(63) Continuation-in-part of application No. 12/647,740, filed on Dec. 28, 2009, now Pat. No. 8,087,360, which is a continuation of application No. 11/605,853, filed on Nov. 28, 2006, now Pat. No. 7,637,213.

(60) Provisional application No. 61/183,395, filed on Jun. 2, 2009, provisional application No. 61/295,740, filed on Jan. 17, 2010.

(51) Int. Cl.
*B61B 7/00* (2006.01)

(52) U.S. Cl. .................... 104/112; 104/113

(58) Field of Classification Search ........... 104/112–115
See application file for complete search history.

(56) References Cited

U.S. PATENT DOCUMENTS

| | | | |
|---|---|---|---|
| 567,186 A * | 9/1896 | Cassidy ................. | 191/33 R |
| 654,687 A * | 7/1900 | Suter .................... | 104/22 |
| 1,935,711 A * | 11/1933 | Hecox et al. ........... | 182/11 |
| 4,150,011 A * | 4/1979 | Searfoss et al. ........ | 523/153 |
| 4,934,277 A * | 6/1990 | Smith et al. ........... | 104/113 |
| 5,094,171 A * | 3/1992 | Fujita .................. | 104/115 |
| 6,622,634 B2 * | 9/2003 | Cylvick ................ | 104/53 |
| 6,666,773 B1 * | 12/2003 | Richardson ............ | 472/49 |
| 7,404,360 B2 * | 7/2008 | Cylvick ................ | 104/112 |
| 7,637,213 B2 * | 12/2009 | Cylvick ................ | 104/112 |
| 7,966,940 B2 * | 6/2011 | Cylvick ................ | 104/113 |
| 8,082,853 B2 * | 12/2011 | Heil et al. ............. | 104/197 |
| 8,087,360 B2 * | 1/2012 | Cylvick ................ | 104/112 |
| 8,234,980 B2 * | 8/2012 | Boren et al. ........... | 104/112 |
| 2002/0007761 A1 * | 1/2002 | Meindl ................. | 104/229 |
| 2005/0029058 A1 * | 2/2005 | Everett et al. ......... | 188/24.11 |
| 2006/0288901 A1 * | 12/2006 | Cylvick ................ | 104/112 |
| 2008/0121470 A1 * | 5/2008 | Cylvick ................ | 188/42 |
| 2010/0300322 A1 * | 12/2010 | Cylvick ................ | 104/112 |
| 2011/0162551 A1 * | 7/2011 | Quattlebaum ........... | 104/112 |
| 2011/0303115 A1 * | 12/2011 | Cylvick ................ | 104/113 |
| 2012/0137924 A1 * | 6/2012 | Boren et al. ........... | 105/150 |

* cited by examiner

*Primary Examiner* — Jason C Smith
(74) *Attorney, Agent, or Firm* — Pate Baird, PLLC

(57) ABSTRACT

A trolley for traveling along a cable may include a frame having a first end, a second end, and a rail extending therebetween. A user may suspend from the frame in a harness, leveraging the user's weight about a fulcrum suspended by a sheave rolling along the cable. Opposite the user, across the fulcrum, a brake shoe or pad pivotably connected to the frame may be controlled by a user shifting weight, a trim brake adjustable by the user, or both to control a braking force generated by the trolley between the brake pad and the cable. Trim braking may be set to stop the trolley on any incline, roll with a constant braking bias, or roll freely. User-weight leveraging may be dynamically adjusted by a user likewise by selectively weighting a harness, weighting a handle and tether to draw the user's weight toward the fulcrum, or both.

20 Claims, 23 Drawing Sheets

TRIM CONTROLLED, DYNAMICALLY CONTROLLABLE, TROLLEY BRAKE

RELATED APPLICATIONS

This application claims the benefit of co-pending U.S. Provisional Patent Application Ser. No. 61/183,395, filed on Jun. 2, 2009 for DYNAMICALLY CONTROLLABLE, TROLLEY BRAKE and U.S. Provisional Patent Application Ser. No. 61/295,740, filed on Jan. 17, 2010 for TRIM CONTROLLED, DYNAMICALLY CONTROLLABLE, TROLLEY BRAKE, and is a continuation in part of U.S. patent application Ser. No. 12/647,740, filed Dec. 28, 2009 now U.S. Pat. No. 8,097,360 for UNIVERSAL BRAKE ASSEMBLY, which is a continuation of U.S. patent application Ser. No. 11/605,853, filed Nov. 28, 2006 for UNIVERSAL BRAKE ASSEMBLY, and now issued as U.S. Pat. No. 7,637,213, all of which are hereby incorporated herein by reference.

BACKGROUND

1. The Field of the Invention

This invention relates to suspended cable systems and, more particularly, to novel systems and methods for braking and retrieving trolleys traveling on suspended cable systems.

2. The Background Art

Many cable-based trolley systems, sometimes called Ziplines, provide no braking They simply use a cable declining at a shallow angle in which a rise at the lower end slows a user. Others may have a brake set at a fixed parameter. Also, current trolleys do not provide a user control "on-the-fly" over the magnitude of a braking force or friction force generated by the trolley as it travels along a cable. That is, to one degree or another, a user or knowledgeable operator must preselect the braking force or the range of braking force to be provided by the trolley. Once selected, the arrangement is not easily or safely changed without stopping the trolley and relieving the trolley of the user's weight.

In certain embodiments, legal liability and user inexperience may favor such inflexibility. However, in other embodiments, greater user control may be desirable. Accordingly, what is needed is a trolley providing safe, "on-the-fly" adjustment between minimum braking and maximum braking.

BRIEF SUMMARY OF THE INVENTION

In view of the foregoing, in accordance with the invention as embodied and broadly described herein, a method and apparatus are disclosed in one embodiment of the present invention as including a trolley comprising a frame, a brake assembly, and a sheave mount. In selected embodiments, a brake assembly in accordance with the present invention may provide significant adjustability. For example, a brake assembly may include a brake pad readily adjustable, even "trimmed" directly by a rider to provide complete control from a full stop on a steep (less than 30 degrees) cable line to free wheeling, and any braking therebetween. desired, customized braking may be effected to suit a user, weather condition, occupational task, or the like.

In selected embodiments, a trolley in accordance with the present invention may provide a user (e.g. operator, rescuer, maintenance worker, or even an individual rider in some circumstances) "on-the-fly" or "dynamic" braking control as well as a direct "trim" control over a braking bias or pre-set condition over the magnitude of a braking force generated by the trolley as it travels along a cable. For example, by adjusting a "trim" brake setting, a user may set a constant braking force by controlling weighting, effective moment arm (e.g. leverage) at which the weight of a user is applied to the frame of a trolley, or both, the magnitude of the resulting braking may be both biased and dynamically controlled.

The magnitude of the normal force against the cable generates the frictional braking force. Accordingly, shifting the effective moment arm at which the weight of a user is applied to the frame of a trolley, or relieving weight away from the arm into a stirrup such as an etrier, a user may dynamically control, within a particular range, the speed of the trolley for a particular catenary, or naturally hanging cable. Likewise, by setting a clamping force on a trim brake, a user may set a background drag force to control speed at any value from a full stop to free wheeling.

In selected embodiments, a trolley may include a carriage configured to secure to, operate with, and be adjusted with respect to a frame or portion of a frame throughout a range of motion bounded by a first position of the carriage and a second position of the carriage with respect to the frame. A carriage may move along the frame through the range of motion without compromising the connection between a user and the cable. Accordingly, adjustment of the position of the carriage with respect to the frame, and the resulting adjustment to the braking force, may safely be accomplished in any suitable manner while the trolley including the carriage and frame is in motion along the cable.

In certain embodiments, absent "dynamic" user control, a carriage may, under the impetus of gravitational acceleration, move toward the second position providing maximum leverage and braking force. Accordingly, a trolley in accordance with the present invention may have a default configuration corresponding to maximum dynamic braking, typically sufficient to bring the trolley to a halt in the event of any operator error or failure of the trolley.

Static control (e.g., "bias" or "trim") braking operates as a substantially constant frictional drag force urged by a clamping force holding the trim brake pads against the cable.

Trolleys in accordance with the present invention may be used as the basis for an amusement ride such as a canopy tour. For such rides, safety and simplicity may be paramount. Thus, an operator may control the bias brake in advance, while a rider controls the dynamic braking during the ride.

In operation, a rescuer may ride a lift cable, such as a ski lift, stopping at each chair or gondola to evacuate passengers. As, or in, an amusement ride configuration, a rider may ride continually descending or may speed, slow, or stop at will. Thus, a ride in accordance with the present invention may begin with selection of a system comprising one or more cables held in suspension between first and second supports and a trolley positioned to travel along each cable. A user may then be connected to the trolley. Following securement of a user into a harness or seat secured thereto, the trolley may be released to travel along the cable from proximate the start area to proximate the finish area. At the finish area, a rider may be disconnected from the trolley. In a rescue or maintenance mode, an operator may disconnect the trolley after servicing one life unit (e.g., chair, gondola, etc.) and move the trolley past that lift unit to ride down to the next unit below.

BRIEF DESCRIPTION OF THE DRAWINGS

The foregoing features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE PREFERRED EMBODIMENTS

Figure 1:
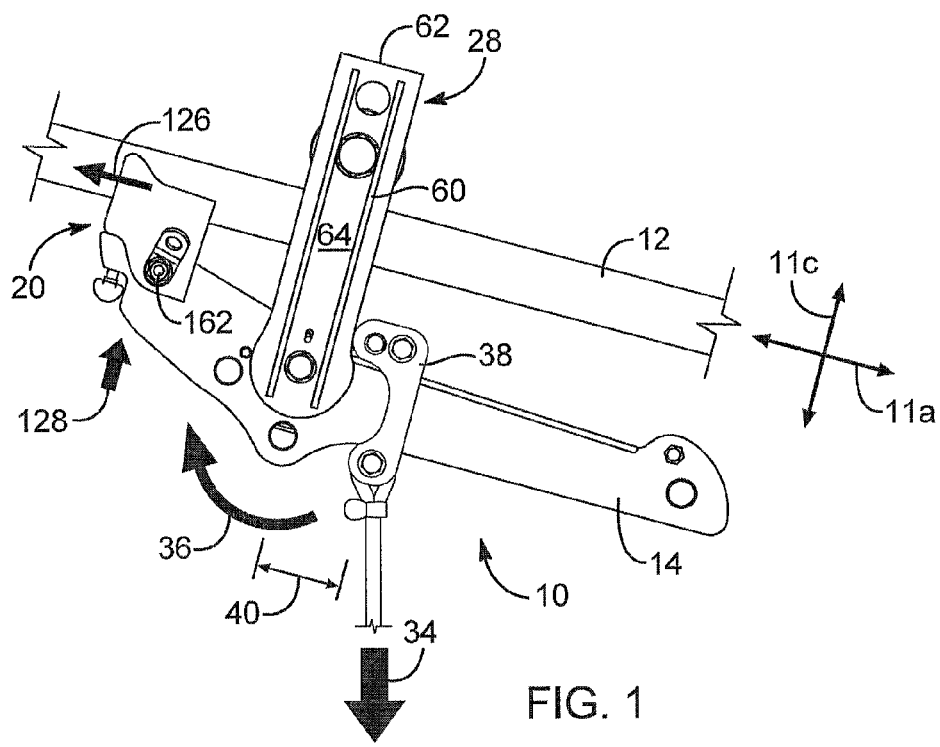
FIG. 1 is a side, elevation view of one embodiment of a trolley, operating on a cable and applying minimum braking in accordance with the present invention.
Figure 2:
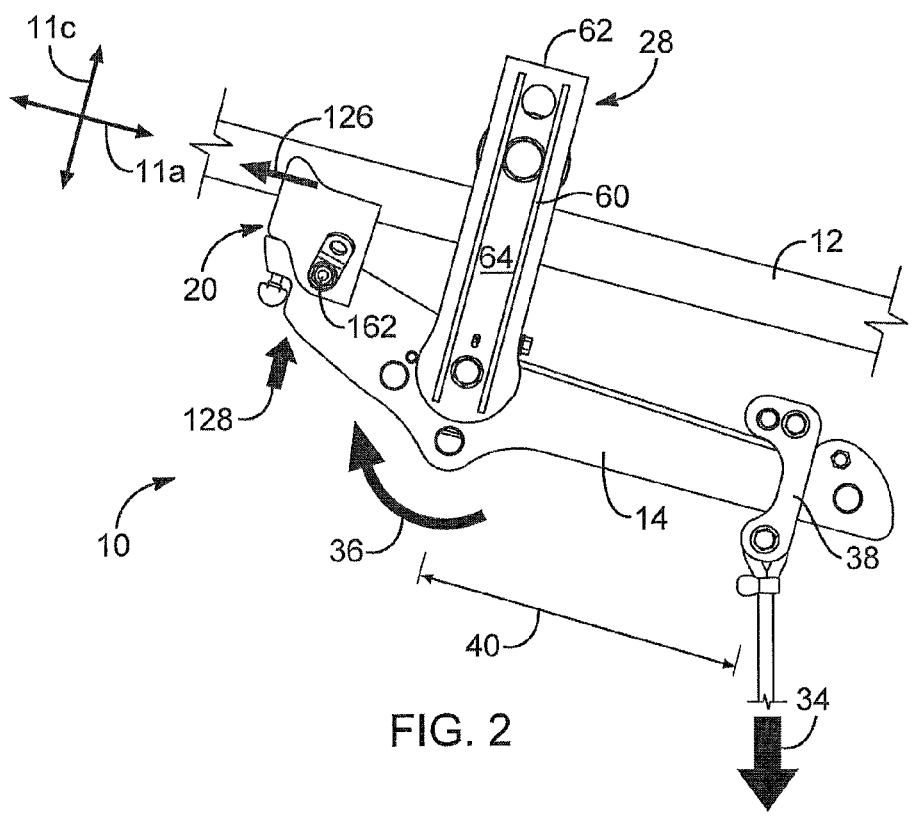
FIG. 2 is a side, elevation view of the trolley of FIG. 1 applying to a cable maximum braking in accordance with the present invention.
Figure 3:
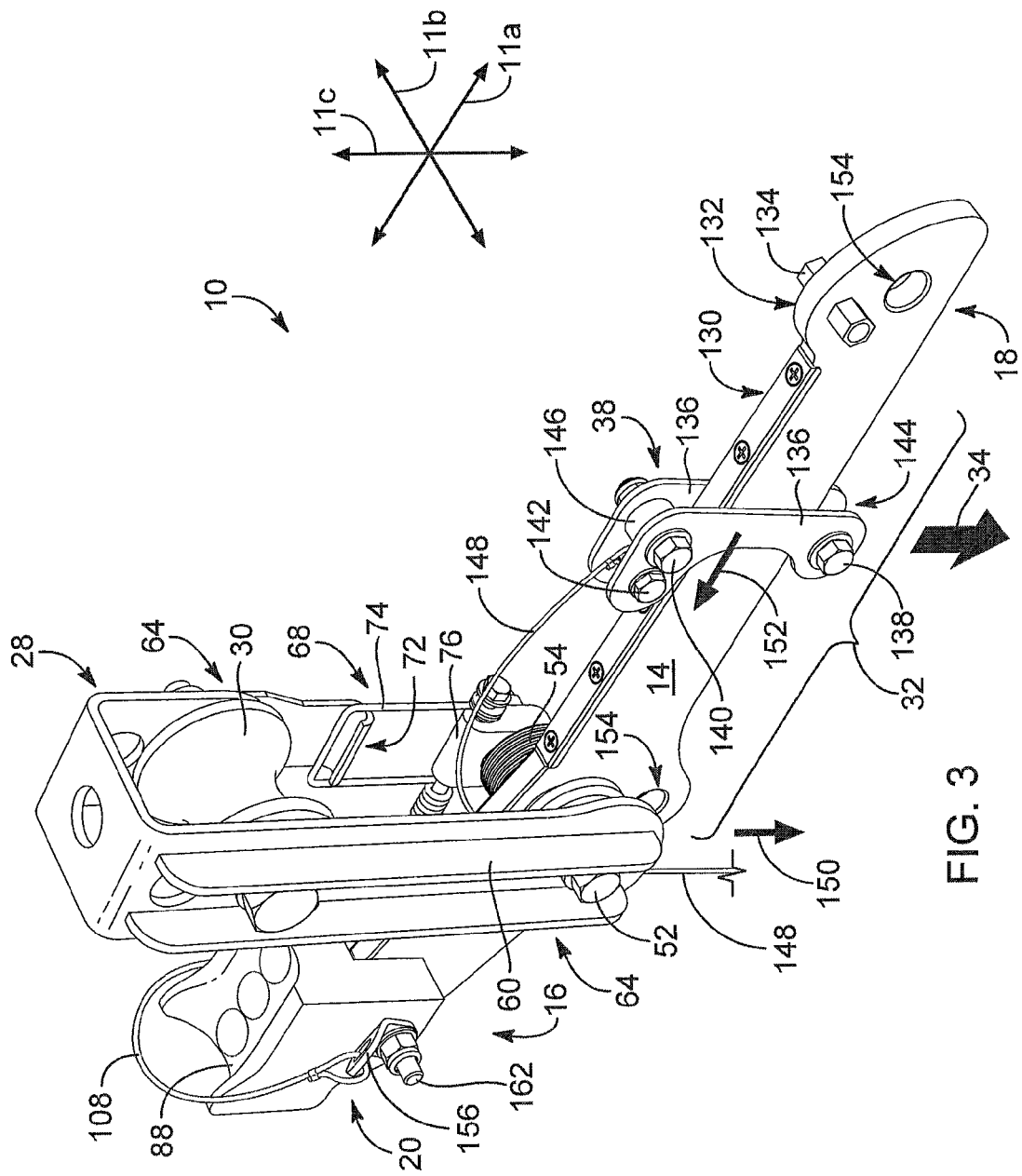
FIG. 3 is a frontal quarter perspective view of the trolley of FIG. 1.
Figure 4:
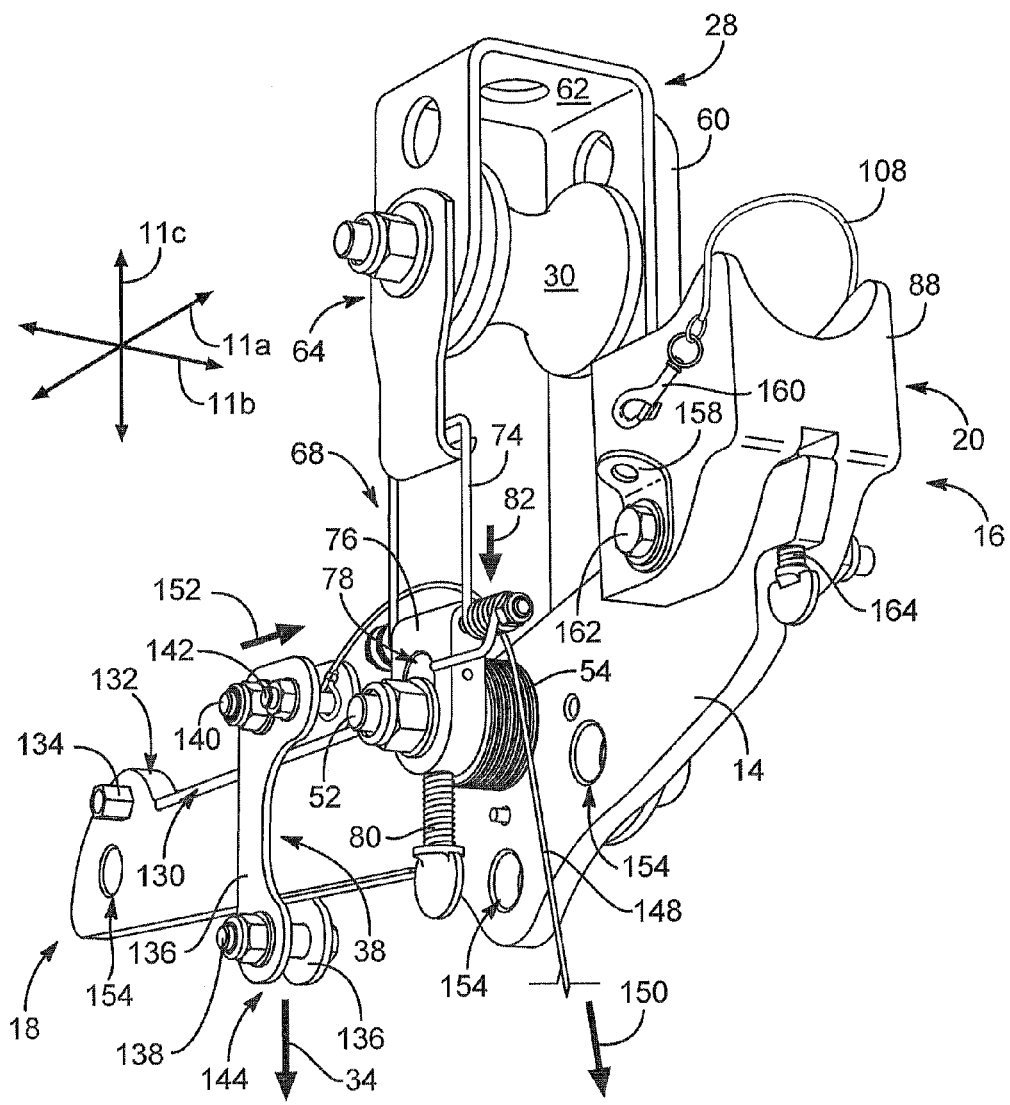
FIG. 4 is rear quarter perspective view of the trolley of FIG. 1.
Figure 5:
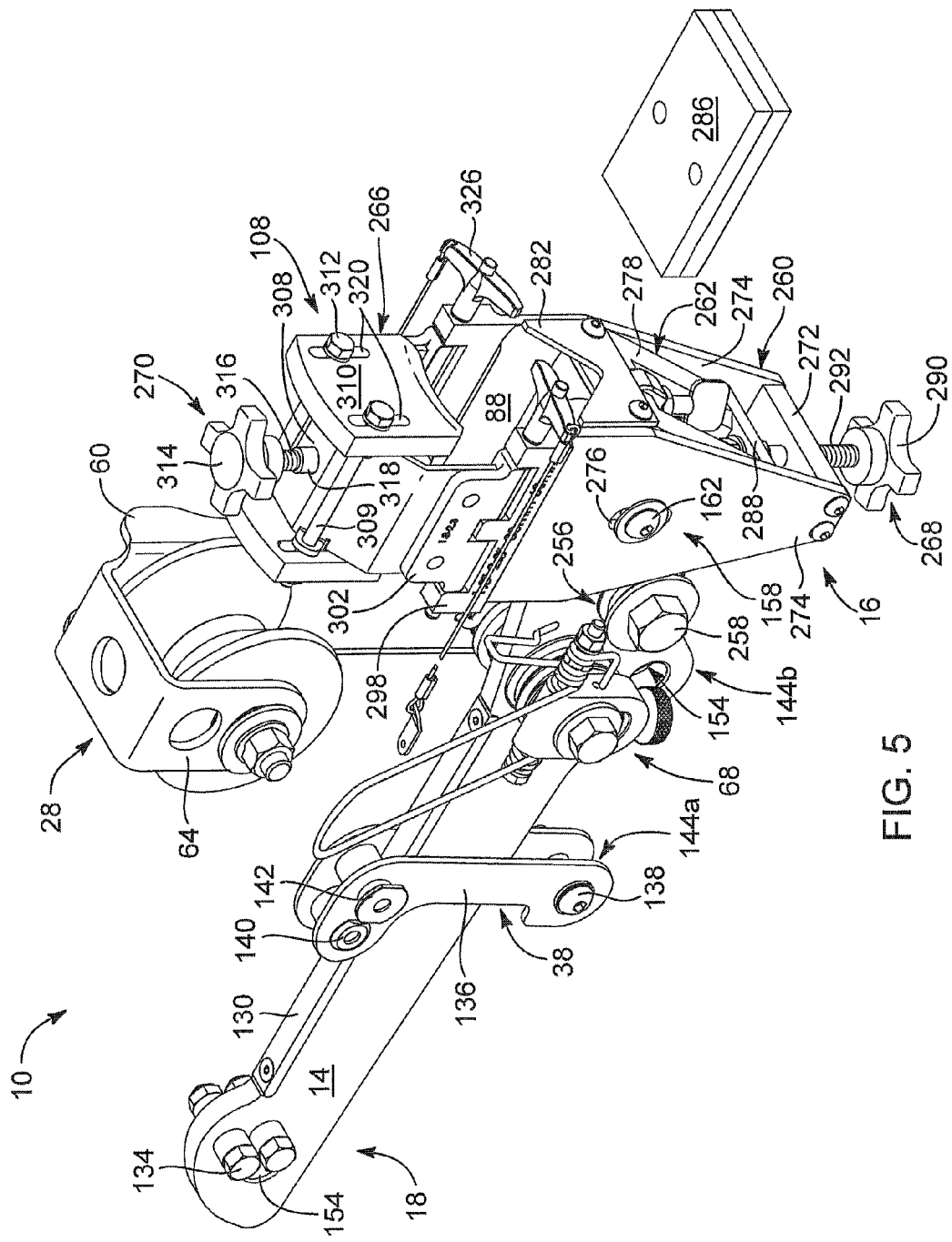
FIG. 5 is a rear quarter perspective view of one alternative embodiment of apparatus in accordance with the invention including a V-shaped sheave and brake shoe for fitting a range of cable sizes, and a trim brake assembly for providing upper and lower trim adjustments for clamping the cable at a desired background or bias level of braking, which may be done instead of or in addition to the dynamic braking of the apparatus by the weight of a user.
Figure 6:
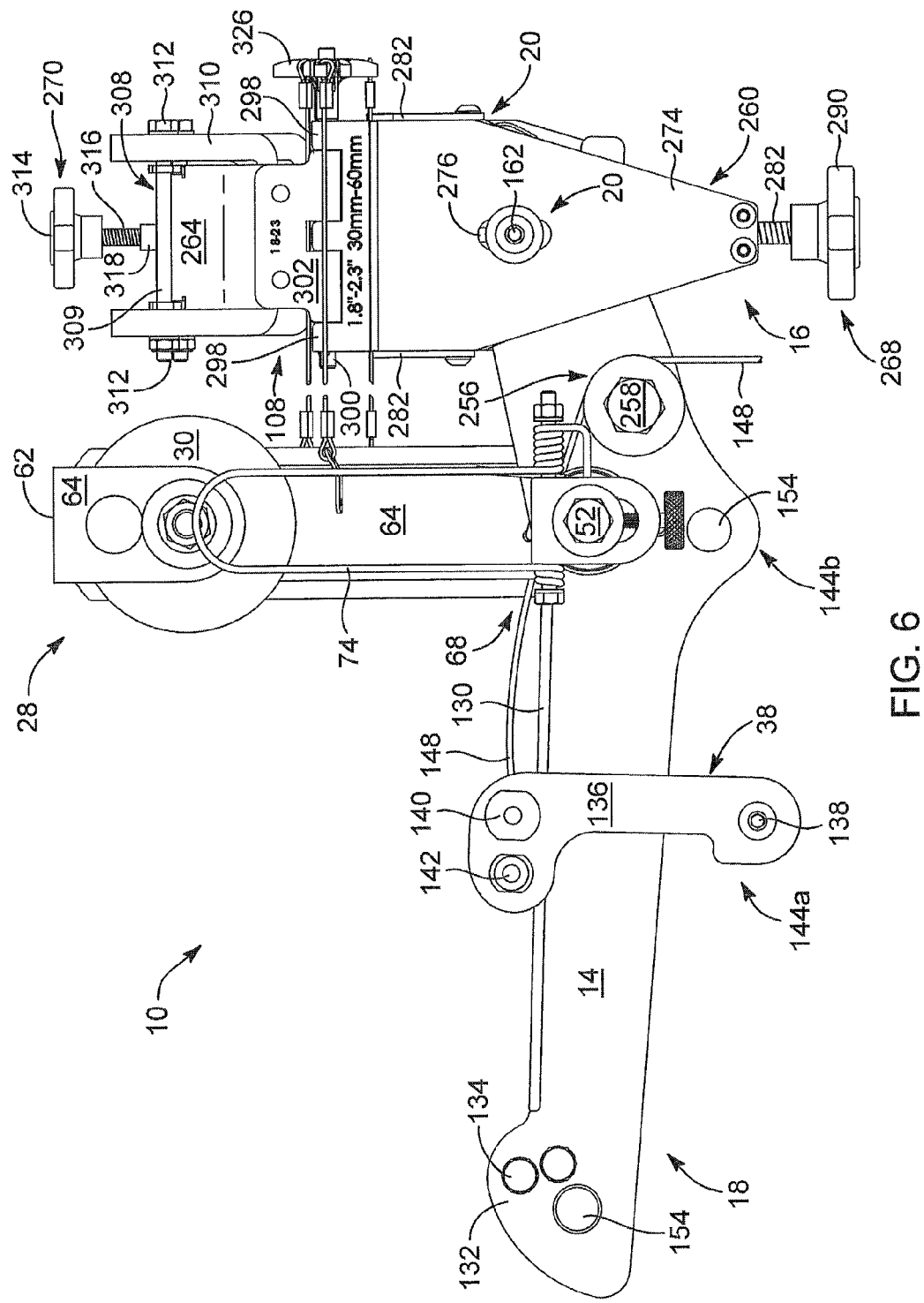
FIG. 6 is a left side elevation view of the trolley embodiment of FIG. 5.
Figure 7:
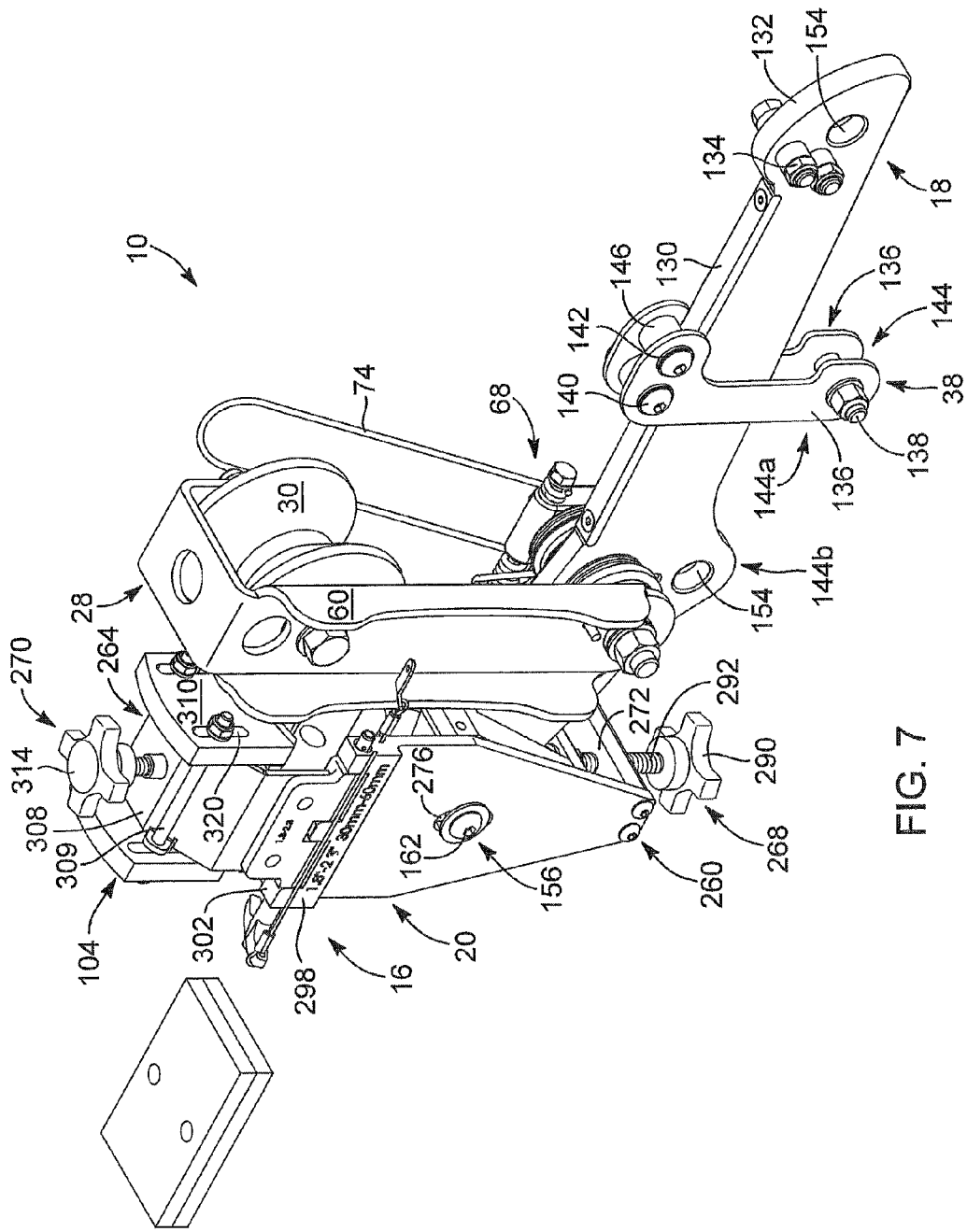
FIG. 7 is a front quarter perspective view of the trolley embodiment of FIGS. 5-6.
Figure 8:
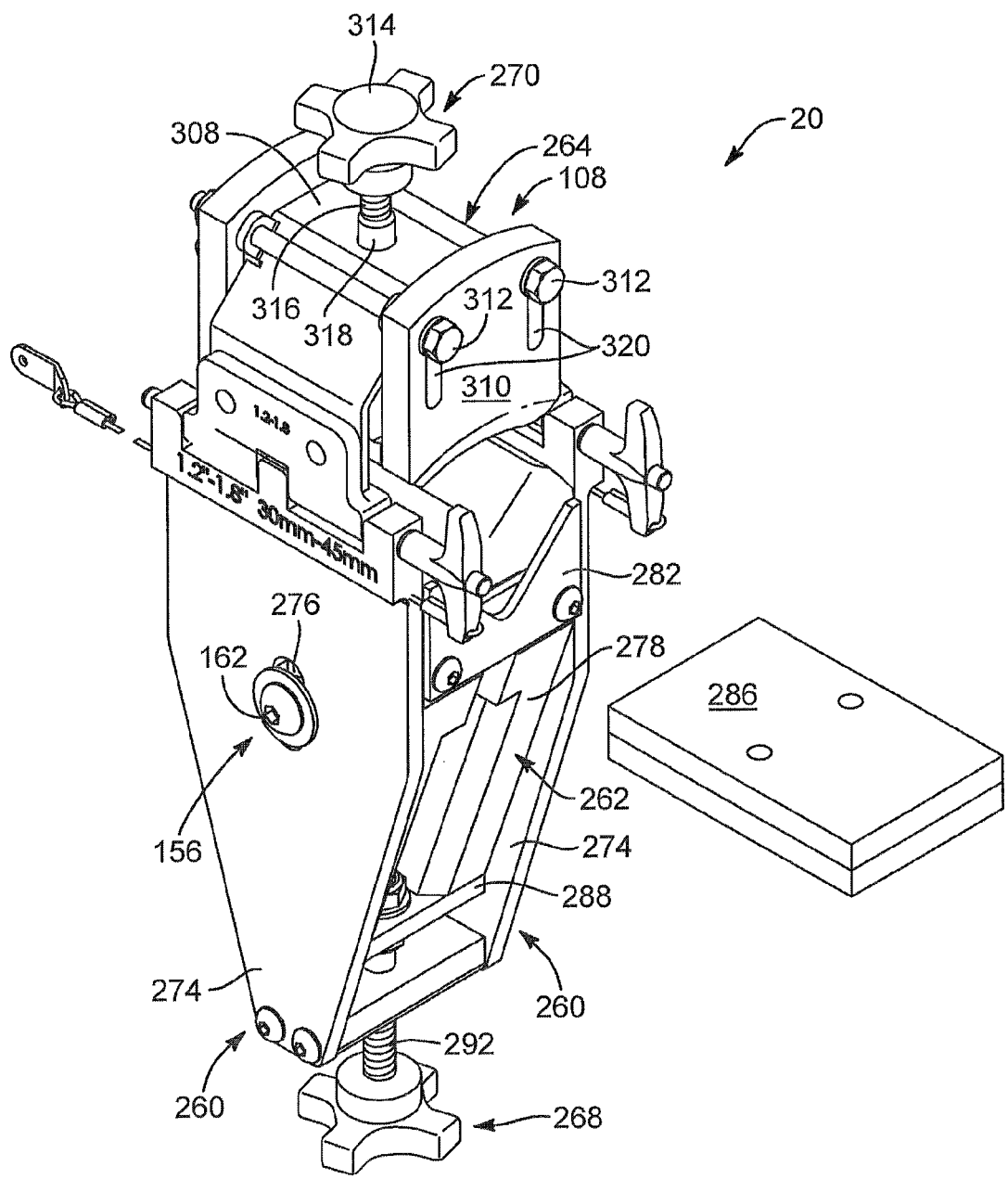
FIG. 8 is a rear quarter perspective view of the brake assembly of the trolley of FIGS. 5-6.
Figure 9:
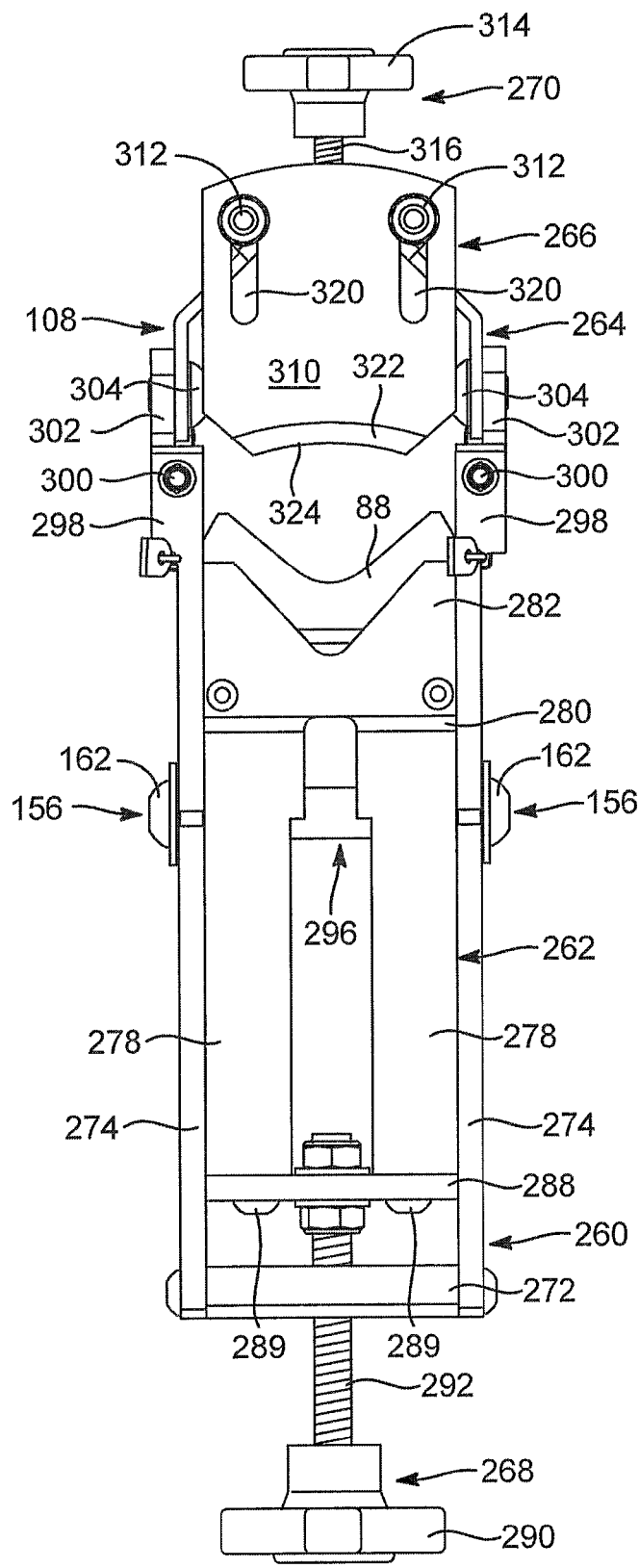
FIG. 9 is a front elevation view of the brake assembly of FIGS. 5-8, as detailed in FIG. 8.
Figure 10:
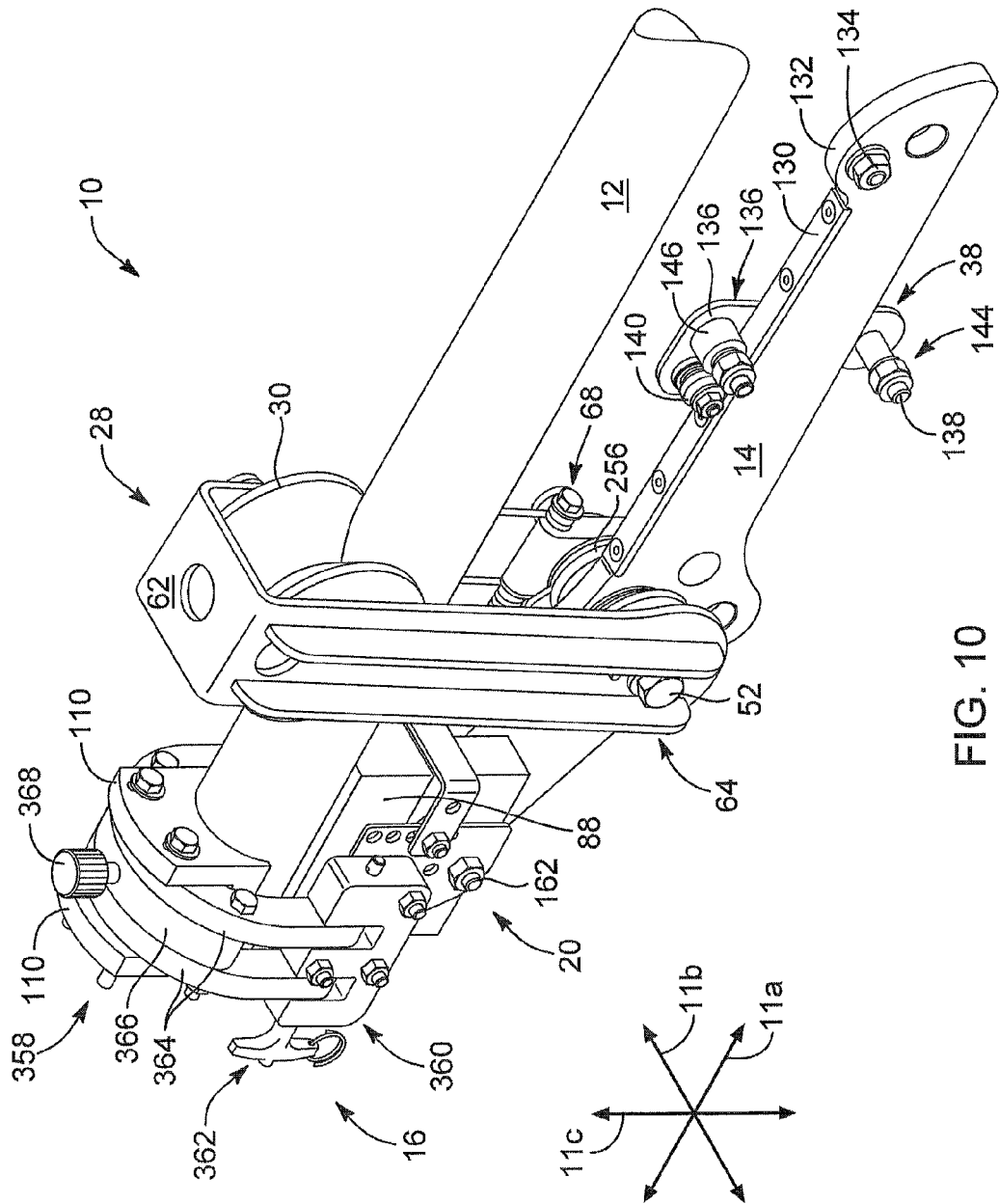
FIG. 10 is a front quarter perspective view of an alternative embodiment of a trolley, having a braking assembly with a top trim adjustment, and the carriage having one side plate removed for clarity.

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, as claimed, but is merely representative of various embodiments of the invention. The illustrated embodiments of the invention will be best understood by reference to the drawings, wherein like parts are designated by like numerals throughout.

Referring to FIGS. 1-4 specifically, while referring generally to FIGS. 1-9, in discussing a trolley 10 in accordance with the present invention, it may be advantageous to establish a coordinate system 11. Accordingly, a trolley 10 may be defined in terms of a longitudinal direction 11a, a lateral direction 11b, and a transverse direction 11c, substantially orthogonal to one another.

A trolley 10 in accordance with the present invention may be configured for travel along a cable 12 in the longitudinal direction 11a. In general, a trolley 10 of the present invention may be applied to a cable 12 held in suspension by two or more supports. For example, as disclosed in U.S. Pat. No. 7,404,360 issued Jul. 29, 2008 and entitled DYNAMICALLY CONTROLLABLE TROLLEY BRAKE, incorporated herein by reference, a cable 12 may be supported between two supports (e.g., towers, platforms). A first support may hold one end of the cable 12 at a higher elevation than a second support holds the other end of the cable 12. Accordingly, a trolley 10 secured to roll along the cable 12 may tend to travel from the first, upper support toward the second, lower support.

While a suspended cable 12 may provide the basis for an amusement ride, other uses are also contemplated. For example, a suspended cable 12 may be used as part of a lift system transporting persons or goods over or up certain geologic obstacles. Suspended cables 12 are commonly used on ski lifts, gondolas, aerial trams, and the like. Similarly, suspended cables 12 have been incorporated into evacuation systems (e.g., oil derrick evacuation systems). In canopy tours also, platforms and bridges may be unnecessary, superseded by cable rides wherein a rider may control speed and stopping along a scenic route strung with cable routes. Whether for repair, evacuation, amusement, transport or as part of the system itself, such suspended cable 12 systems may require a trolley 10 in accordance with the present invention.

In selected embodiments, a frame 14 may provide the main structure of the trolley 10 or a base to which other components may secure. A frame 14 may be formed of any suitable material or combination of materials. Characteristics that may be considered when selecting the material for the frame 14 may include cost, formability, machineability, strength, rigidity, durability, corrosion resistance, density, etc. In certain embodiments, aluminum has been found to be a suitable material for a frame 14.

A frame 14 may extend from a first end 16 to a second end 18. In certain embodiments, a brake assembly 20 may connect to the frame 14 proximate the first end 16 thereof.

A sheave mount 28 may connect to the frame 14 at a location between the brake assembly 20 and the second end 18. A sheave mount 28 may support one or more sheaves 30 positioned to roll along the cable 12. In selected embodiments, the portion 32 of the frame 14 between the sheave mount 28 and the second end 18 may be characterized as the user-suspension-portion 32. That is, the weight of a user may be directed to, and supported by, this portion 32 of the frame 14.

In certain embodiments, the frame 14 of a trolley 10 in accordance with the present invention may be suspended below a cable 12 in the transverse direction 11c. A sheave mount 28 may extend upwardly from the frame 14, positioning a sheave 30 to roll on an upper surface of the cable 12. A brake assembly 20 may extend upwardly from the frame 12 to contact a lower surface of the cable 12. With the brake assembly 20 and user-suspension portion 32 on opposite sides of the sheave mount 28, the weight 34 of a user applied to the user-suspension portion 32 may generate a torque 36 or moment 36 urging the brake assembly 20 to "pitch" against the underside of the cable 12 (i.e., generate or urge rotation about an axis extending in the lateral direction 11b). The greater the moment 36 generated, the greater the braking force or friction force produced by the brake assembly 20.

A carriage 38 may provide the primary interface between a user and a trolley 10 in accordance with the present invention. That is, while other locations, apertures, connection, structures, and the like may be used for redundant, fail-safe systems, in normal use, the majority of user weight 34 may be applied to the carriage 38. The carriage 38, in turn, may communicate that load to the frame 14.

The position of the carriage 38 with respect to the frame 14 may be adjusted to provided a desired braking force. For example, the greater the distance 40 between the sheave mount 28 and the carriage 38, the greater the moment 36 and resulting braking force. The opposite may also be true. That is, the braking force may be minimized by minimizing the moment arm 40 over which the weight 34 of a user may act.

Adjustability and securement between a carriage 38 and a frame 14 may be provided by any suitable structures. Accordingly, a trolley 10 in accordance with the present invention may be tuned to a particular cable 12 arrangement. That is, a trolley 10 may be formed according to a single design, yet be flexible within that design to provide braking appropriate for a wide range of cable 12 arrangements.

For example, given a first cable 12 arrangement involving a comparatively larger change in elevation, a trolley 10 traveling on such a cable 12 may tend to reach excessive speeds.

Conversely, consider a second cable 12 arrangement involving a minimal change in elevation. For such an arrangement, a carriage 38 may provided excessive braking For example, the resultant braking may cause the trolley 10 to stop without reaching the destination at the bottom of the cable 12. According, for such arrangements, a bias or trim brake may be set for reduced braking. A user may control speed by altering the effective moment arm 40 as described hereinbelow. By so positioning the carriage 38, the trolley 38 may control speed along the cable 12.

The braking force generated by a trolley 10 is equal to the coefficient of friction between the brake assembly 20 and the cable 12 multiplied by the normal force urging the braking assembly 20 against the cable 12. For a single moment arm 40, the only variable becomes the weight 34 of the user. Accordingly, the normal force urging the braking assembly 20 against the cable 12, which is result of the moment 36 applied by the weight 34 of a user to the frame 14, controls the braking force. A trolley 10 may be tuned to a particular cable 12 arrangement, but may also be tuned by each user as described hereinbelow.

A trolley 10 in accordance with the present invention may include any desirable redundant or fail-safe systems. For example, in selected embodiments, a frame 14 may include a slot 50 within or along which the carriage 38 may travel. Accordingly, if the pin 44 holding the carriage 38 in a particular location were to fail, the carriage 38 would not be free to separate from the frame 14. Additionally, the orientation of the slot 50 with respect to the weight 34 of a user may urge an unpinned carriage 38 toward the end of the slot 50 corresponding to the second end 18 of the frame 14. At such a location, the moment arm 40 and corresponding braking force may be at a maximum. Accordingly, if a pin 44 were to fail, the link between the user and the cable 12 would not be lost and the trolley 10 would quickly be brought to a halt.

Referring to FIGS. 1-4, while referring generally to FIGS. 1-9, in selected embodiments, a sheave mount 28 in accordance with the present invention may be pivotally secured to a frame 14. For example, in certain embodiments, a bolt 52 may extend through the frame 14. If desired, a roller or bushing 54 may be positioned over the bolt 52 to improve wear resistance, increase the rigidity of the bolt 52, or the like.

In certain embodiments, to increase safety, a sheave mount 28 may provide an enclosure capturing a cable 12 therewithin. That is, once the sheave mount 28 has received a cable 12 therewithin, it may resist inadvertent removal of that cable 12. A sheave mount 28 may include one or more ribs 60 to increase the rigidity and strength thereof. A top 62 of the sheave mount 28 may connect the two sides 64 of the sheave mount 28. In selected embodiments, admittance and release of a cable 12 from within the sheave mount 28 may be done by bail assembly 68 including a hook 72.

A bail assembly 68 may include a bail 74 and a bail mount 76 connecting to the bolt 52.

A tensioner 80 may control the position of the bolt 52 within the slotted aperture 78. Accordingly, once a cable 12 has been received within a sheave mount 28 and the bail 74 has returned to a closed position, the tensioner 80 may be adjusted to move the bail assembly 68 with respect to the bolt 52. Thus, the bail 74 may be pulled 82 firmly into engagement with the hook 72 and resist opening of the bail 74. Additionally, the bail assembly 68 may assist in transferring loads from a sheave 30 to the frame 14 of the trolley 10.

Referring to FIGS. 1-4, and to FIGS. 1-9 generally, in selected embodiments, a trolley 10 in accordance with the present invention may include a brake assembly 20 that is pivotally secured to the frame 14. A pivotable connection between a brake assembly 20 and a frame 14 may support a more controlled and even wear on the brake assembly 20.

Referring to FIGS. 1-4, while continuing to refer generally to FIGS. 1-9, a brake assembly 20 in accordance with the present invention may provide significant adjustability. For example, a brake assembly 20 may include a brake pad 88 that may have one or more elements 89 to be replaced, as wear so dictates. Additionally, a brake pad 88 may itself be adjustable to provide a desired or customized braking effect.

In one embodiment, opposing brake shoes may be clamped opposite one another on the cable 12. Adjustment screws may urge them together, against the cable. Accordingly, any fastener (e.g., thumbscrew, knob, etc.) may be tightened, clamping the brake pads 88 to the cable 12 and reducing the ability of the brake assembly 20 to pivot with respect to the frame 14.

A brake assembly 20 in accordance with the present invention may include a capture 108. A capture 108 may secure a cable 12 therewithin. That is, once a trolley 10 is applied to a cable 12, the capture 108 may secure the brake assembly 20 to the cable 12. Accordingly, the capture 108 may provide a redundant safety mechanism and, should there be a catastrophic failure of the sheave mount 28, the trolley 10 may be secured to the cable 12 via the brake assembly 20 and capture 108. If desired, a capture 108 may include a brake pad over the cable 12 to effect clamping of a trim brake slide 110.

Various material properties and characteristics may be considered when selecting a material for a brake pad 88 in accordance with the present invention. Properties and characteristics that may be considered include cost, availability, machineability, wear resistance, toughness, all weather performance (e.g., characteristics at various conditions of humidity, moisture, corrosion, temperature, and the like), coefficient of friction against a cable 12 in various weather conditions (e.g., temperature and wetness levels), and the like. Often a material that has certain advantageous characteristics may have others that are disadvantageous. For example, one material may have excellent wear resistance, but its coefficient of friction against a cable 12 may vary greatly depending on whether the cable is dry. Accordingly, the material may be suitable for dry conditions, yet be hazardous for wet conditions.

Referring to FIGS. 1-4, as well as FIGS. 1-9 generally, in selected embodiments, a trolley 10 in accordance with the present invention may provide a user readily adjustable, or even "on-the-fly," control over the magnitude of a braking force 126 or friction force 126 generated by the trolley 10 as it travels along a cable 12. The braking force 126 may be equal to the normal force 128 urging the brake assembly 20 against the cable 12 multiplied by the friction coefficient for the brake pad 88 against the cable 12. With the friction coefficient for the brake pad 88 against the cable 12 being substantially constant, the braking force 126 may perhaps most easily be manipulated by manipulations of the normal force 128.

For example, by adjusting the moment arm 40 at which the weight 34 of a user is applied to the frame 14 of a trolley 10, the magnitude of the resulting moment 36 may be controlled. The magnitude of the moment 36 may then dictate the magnitude of the normal force 128. Accordingly, by adjusting the moment arm 40 at which the weight 34 of a user is applied to the frame 14 of a trolley 10, a user may control, within a particular range, the braking force 126 generated by the trolley 10.

Figure 11:
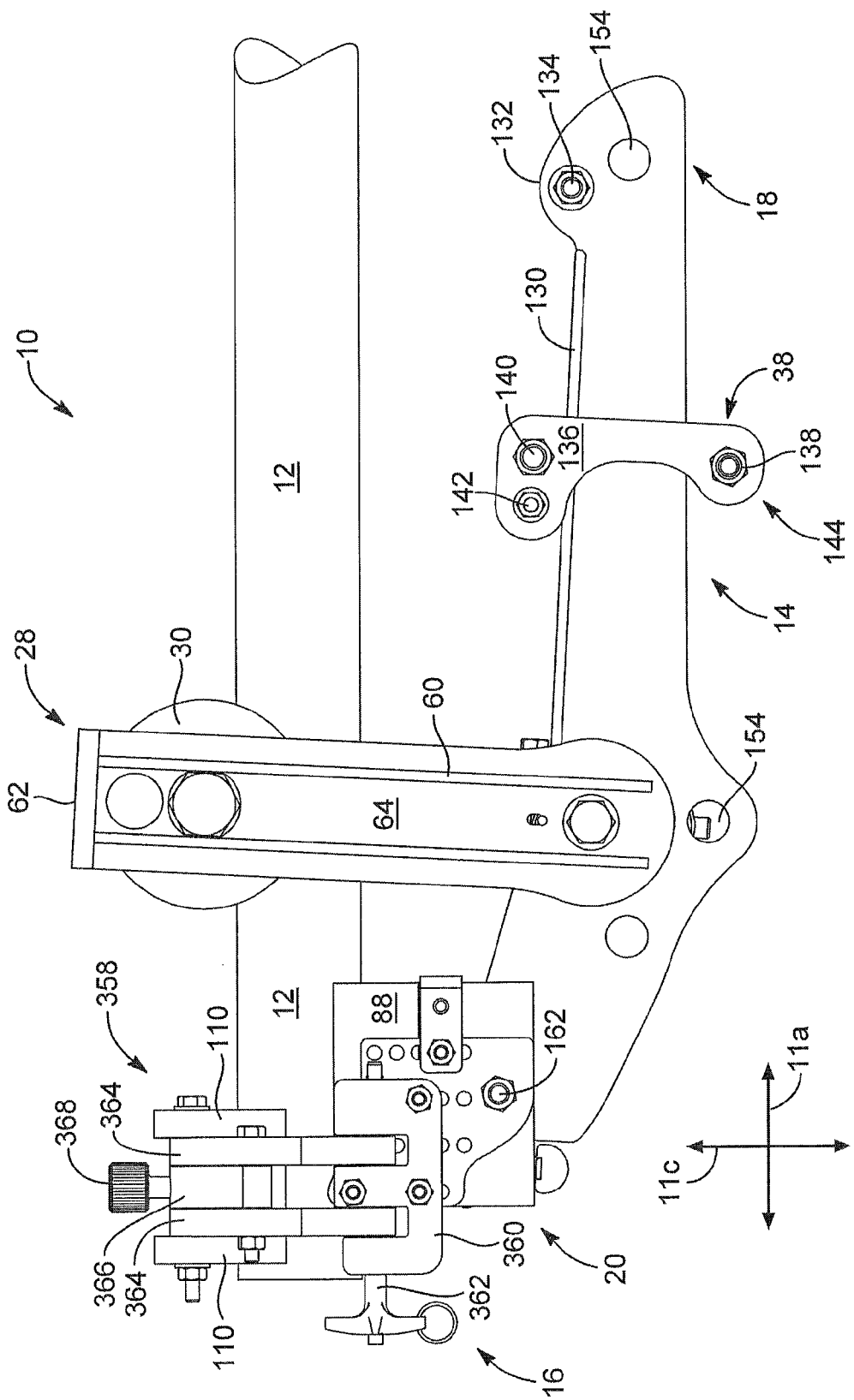
FIG. 11 is a left side elevation view of the trolley of FIG. 10, with the side plate of the carriage in place.
Figures 12, 13:
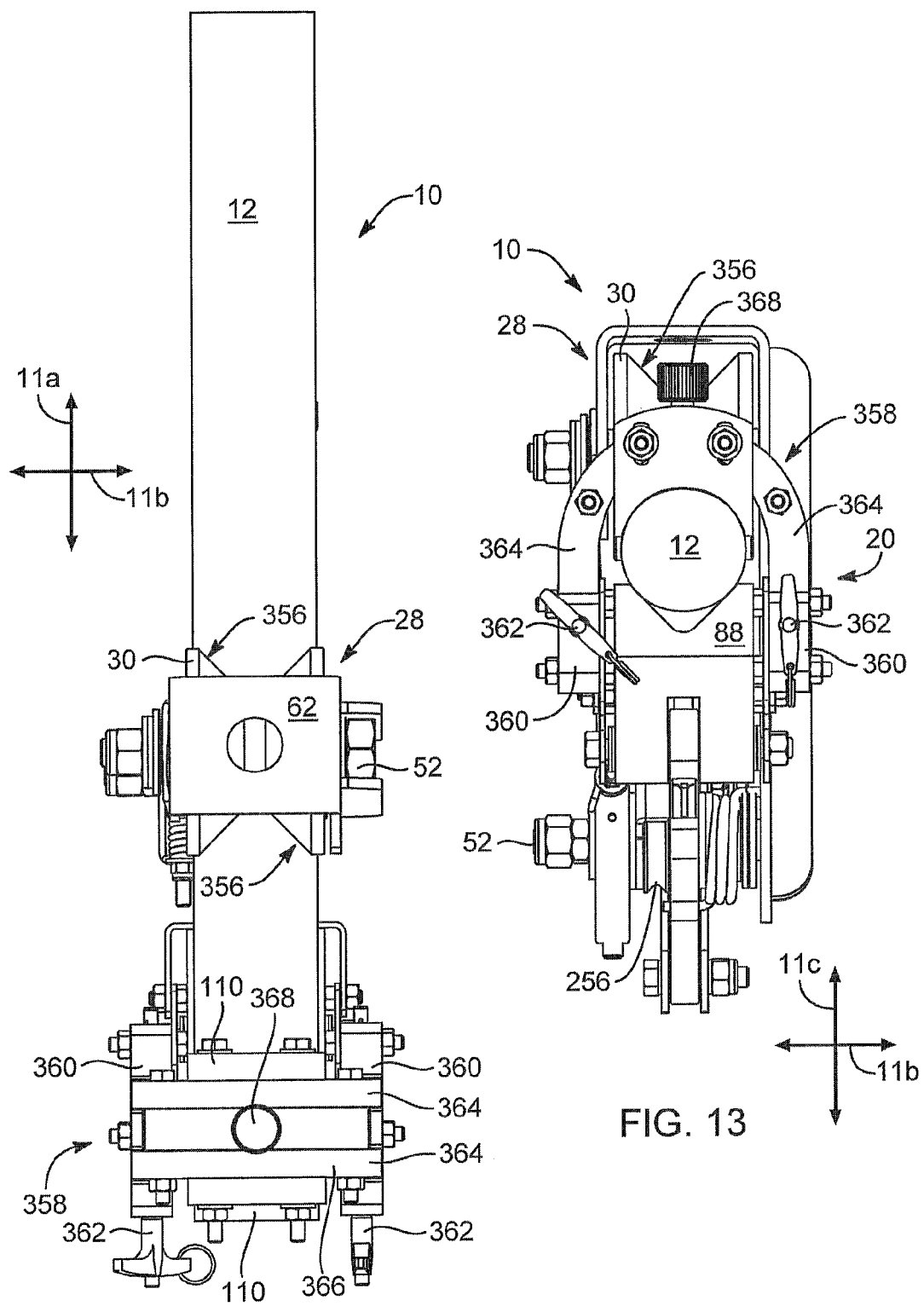
FIG. 12 is a top plan view of the trolley of FIG. 10, and illustrating a V-shaped embodiment of a sheave.
FIG. 13 is a rear elevation view of the trolley of FIG. 10, illustrating a top trim adjustment and a V-Shaped lower brake shoe or brake pad.

In selected embodiments, a trolley 10 in accordance with the present invention may include a carriage 38 configured to travel along a frame 14 or portion of a frame 14 through a range (e.g., continuous range) of motion bounded by a first position of the carriage 38 proximate the sheave mount 28 (e.g., the position of the carriage 38 in FIG. 11) and a second position of the carriage 38 proximate a second end 18 of the frame 14 (e.g., the position of the carriage 38 in FIG. 12).

In certain embodiments, a carriage 38 may travel along the frame 14 through the range of motion bounded by the first and second positions without compromising the connection between a user and the cable 12. Accordingly, adjustment of the position of the carriage 38, and the resulting adjustment to the braking force 126, may safely be accomplished in any suitable manner while the trolley 10 is in motion along the cable 12. That is, in selected embodiments, neither a stopped trolley 10 nor any change in the connection between a user and a cable 12 may be necessary to transition from minimum leverage and braking to maximum leverage and braking.

In selected embodiments, the default position of a carriage 38 with respect to the frame 14 may be the second position (e.g., the position of the carriage 38 in FIG. 12). That is, absent contrary inputs or forces, a carriage 38 may, under the impetus of gravitational acceleration, move toward the second position. At the second position, the braking force 126 may be at a maximum. Accordingly, a trolley 10 in accordance with the present invention may have a default configuration corresponding to maximum braking, which, given typical cable 12 declination, is sufficient to bring the trolley 10 to a halt.

Referring to FIGS. 1-4, and FIGS. 1-9 generally, in selected embodiments, a trolley 10 in accordance with the present invention may be configured to facilitate travel of the carriage 38 along the user-suspension portion 32 of the frame 14. For example, in selected embodiments, a frame 14 may include a rail 130 to provide a suitable surface over which a carriage 38 may travel. In certain embodiments, a rail 130 may provide a substantially planar surface. If desired, a rail 130 may be formed of a material dissimilar from the rest of the frame 14. For example, in embodiments where the frame 14 may be formed of aluminum, a rail 130 formed of steel may be connected to the frame 14 to provide a more durable surface over which a carriage 38 may travel.

A trolley 10 may be configured to resist removal of a carriage 38 from the frame 14. For example, in selected embodiments, a sheave mount 28 may prevent a carriage 38 from passing there beyond (e.g., beyond the first position). Similarly, the second end 18 of the frame 14 may be configured to prevent a carriage 38 from passing there beyond (e.g., beyond the second position). For example, in certain embodiments, the second end 18 of the frame 14 may be shaped to include a rise 132 extending transversely 11*c* from the frame to resist passage of the carriage 38 thereover. Also, in some embodiments, the second end 18 of a frame 14 may include a stop 134 (e.g. bolt, pin, etc.) extending laterally 11*b* from the frame to block passage of the carriage 38.

In certain embodiments, a carriage 38 may include two cheek plates 136 bracketing the frame 14. Various fasteners 138, 140, and 142 may extend between the cheek plates 136 to connect the plates 136 together. Such fasteners 138, 140, 142 may also support various functions of a carriage 38. For example, one fastener 138 may provide a user mount 144 or a location 144 at which a user may connect to or tie into the carriage 38 and transfer his or her weight 34 thereto. Another fastener 140 may support a roller 146, bushing 146, or bearing 146 facilitating travel of the carriage 38 along the rail 130. Yet another fastener 142 may provide a structure supporting manipulation of the carriage 38 along the rail 130.

For example, in selected embodiments, a fastener 142 may provide a location for a tether 148 to engage the carriage 38. If desired, a tether 148 may extend from the carriage 38, over the pivot 52, bolt 52, or fastener securing the sheave mount 28, and down toward a user. Thus, by pulling 150 down on the tether 148, a user may pull 152 the carriage 38 toward the first position and the minimum braking corresponding thereto. Conversely, by releasing the tether 148 or sufficiently lowering the downward force 150 applied to the tether 148, the carriage 38 may travel toward the second position and the maximum braking corresponding thereto.

A user may engage or manipulate a tether 148 in any suitable manner. For example, in one embodiment, a tether 148 may be connected to a handle suspended at an appropriate height for the user. Accordingly, the user may simply grab the handle and pull 150 down on the tether. Alternatively, a tether may extend to engage the foot of a user. For example, a user may position a foot within a loop connected to the tether 148. Thus, by weighting the foot (e.g., shifting some of the weight 34 of the user from the carriage to the tether 148), the tether 148 may be pulled 150 downward.

Accordingly, while a carriage 34 may be the primary suspension point for the weight 34 of the user, portions of that weight 34 may be diverted as necessary to adjust the position of the carriage 38 or to otherwise increase the safety of a trolley 10. For example, in selected embodiments, various apertures 154 may be provided in a frame 14. Such apertures 154 may support redundant user support systems taking a portion of the weight 34 of a user in normal use and a substantial portion of the weight 34 of a user in compromised use. Additionally, such apertures 154 may provide locations for supporting other loads or persons not directly responsible for the operation of the trolley 10 (e.g., a rescue being lowered from a stalled chair lift).

In selected embodiments, a trolley 10 in accordance with the present invention may be configured for rapid engagement with and disengagement from a cable 12. In such embodiments, a capture 108 may be omitted. Alternatively, a capture 108 providing rapid release may be employed. For example, in one embodiment, a capture 108 may comprise a flexible cable. So configured, the capture 108 may extend from a first mount 156 positioned on one side of a brake assembly 20 to a second mount 158 positioned on the other side of the brake assembly 20. The engagement between the capture 108 and one mount 156 may be substantially permanent, while a release mechanism 160 (e.g., quick release hook, carabineer, or the like) may provide selective engagement between the capture 108 and the other mount 158.

In certain embodiments, a brake pad 88 may be formed as a monolithic and homogeneous unit. For example, a brake pad 88 may be formed as a single, seamless piece of a non-elastic material (e.g., UHMWPE). Alternatively, a brake pad 88 may include various other materials such as a fiber-reinforced polymer. A Kevlar™ fiber reinforcement of a phenolic resin provides satisfactory braking characteristics. A pivot bolt 162 may pivotally secure the brake pad 88 to the frame 14. If desired or necessary, a brake assembly 20 in accordance with the present invention may include an adjustable stop 164. In some embodiments, the adjustable stop 164 may provide a selectively adjustable limit on the pivoting of the brake pad 88. In other embodiments, the adjustable stop 164 may dictate the angle at which the brake pad 88 may contact a cable 12.

Referring to FIGS. 1-9, in selected embodiments, a capture 108 may be used to secure a brake assembly 20 to a cable 12. If desired, a capture 108 may be positioned to be part of or work with the brake assembly 20 in order to provide trim braking against the cable 12. For example, a capture 108 may be positioned such that it and the brake assembly 20 both have a brake pad 88 opposite one another and simultaneously in contact with a cable 12. The pads 110 of the trim system 108 or capture 108 may be formed of various materials (e.g., materials such as those used in a brake pad 88) to provide a desired bias or trim braking effect. Such an arrangement may provide additional continual, bias, trim or constant control over the motion of the trolley 10 with respect to the cable 12 in addition to dynamic braking.

The normal force 128 may thus be applied to top and bottom of the cable. Force may be increased sufficiently to hold the trolley 10 in place on the cable 12 both during application of the trolley 10 the cable 12 and securement of a user to the trolley 10. Likewise the clamping force may be set to control speed at some maximum desired. The effect of the capture 108 may thus bias the cable 12 against the brake pad 88, hold the trolley 10 in place, provide additional braking effect in operation, or some combination thereof. In practice, substantially any desired braking force is readily achieved by manually turning a knob or thumbscrew drawing the pad 110 of the capture 108 against the cable 12 opposite the brake pad 88 of the braking assembly 20. On portions of a cable 12 having little declination, the captures 108 may be loosened or released to eliminate the braking effect.

Moreover, by tensioning the capture 108 sufficiently to prevent motion of the trolley 10 along the cable 12, a user may not have to contend with the trolley 10 sliding along the cable 12 as the user is attempting to properly apply weight 34 to the frame 14. This may provide more precise control of movement of the trolley 10 at all times, particularly on portions of the cable 12 at steep angles (e.g., greater than 30 degrees) or in close quarters near suspended chairs or gondolas being serviced.

Referring to FIGS. 5-9, while continuing to refer generally to FIGS. 1-9, a trolley 10, in accordance with the invention, riding on a cable 12, may encounter any number of conditions. Not only weather, but also the steepness of the angle of a particular cable 12 may vary substantially. Particularly, in circumstances where a cable 12 sustains an array of gondolas or chairs from a chair lift, or the like, the angle of the cable 12 surrounding such devices may vary dramatically.

For example, as a cable 12 passes over pulleys on a support tower, the cable will change its angle with respect to horizontal or vertical, sometimes dramatically. Likewise, as a rider of the trolley 10 rides a cable 12 down toward a particular device, such as a gondola or chair, the angle of the cable 12 may vary dramatically between its approach angle and departure angle with respect to that particular device. Meanwhile, down the terrain of any mountain the cable 12 may vary from horizontal, to uphill, to downhill, to steeply downhill.

Thus, a user may need to accommodate comparatively steep angles, greater than 30 degrees from horizontal, in certain instances, and yet comparatively flat angles, much closer to horizontal in other circumstances. Accordingly, in one embodiment of an apparatus in accordance with the invention, a user may rely on two types of braking, a dynamic braking to control speed variation, as well as a bias braking or "trim" braking in order to provide a background or continuous drag force. Trim braking may provide a constant setting for drag on a trolley 10, and may be used to completely stop the trolley 10, such as for servicing a lift unit (chair, gondola, etc.), for boarding at any location, such as a lift station at the top of a cable lift, or the like.

In one embodiment, a trolley 10 in accordance with the invention may include a brake assembly including two types of control. The dynamic braking may be controlled by a user weighting the mount 144 with that user's weight, and shifting the effective center of that load, as described hereinabove. For example, a user may draw the carriage 38 backward, by applying weight to the tether. This also moves a user's weight off the carriage. Regardless, a user may relieve some of that user's weight by loading the tether 148 or some other location 144b with all or a portion of the user's weight. That portion of the user's weight may range anywhere from zero to all of a user's weight, at will.

A user may weight the tether 148 by pulling on a handle, putting a foot into a stirrup connected to the tether 148, or the like. Inasmuch as the tether 148 passes along the frame 14, above and beside the rail 130, and over a supporting roller fastened to the frame 14 by the connecting bolt 52, a user may apply vertical weight on a stirrup, drawing the tether 148 and thus the carriage 38 back toward the brake assembly 20. In the embodiment of FIGS. 5-9, the carriage 38 is configured to draw the fasteners or fastener 138 back to a position under, or even behind, the bolt 52 through the frame 14.

By providing a roller 256 held by an additional bolt 258, for the tether 148 to pass over, a user may actually provide complete shifting of the user's weight to a point behind the pivoting bolt 52 about which the frame 14 rotates. Accordingly, a user may completely unload or reverse the moment otherwise created by the carriage 38 pulling on the frame 14 from its normal location, closer to the front end 18 thereof.

In certain embodiments, a user may fit a stirrup or etrier (a daisy chain of foot stirrups used in rock climbing) connected to the tether 148 in order to more easily apply the user's entire weight to the tether 148. The result includes retracting the carriage 38 to a position under the bolt 52. In alternative embodiments, or alternative uses, a user may connect a harness, carabiner, anchor, or the like to an aperture 154 at the region 144b or mount region 144b.

Accordingly, suspended from the aperture 154 in the mount 144b, an etrier, stirrup, bosun (boatswain) chair, or the like may be suspended directly under the pivot 52. This may result in completely removing the weight of a user from the influence of the dynamic braking otherwise provided by the carriage 38 pulling down on the front end 18 of the frame 14.

Nevertheless, in a dynamic braking environment, a user may rely on user weight applied to the user mount 144 modulated by the user weight applied to a stirrup or etrier connected to the tether 148 behind the roller 256 on the bolt 258. In this way, a user may provide a leverage advantage equivalent to multiple times the user's weight. Leverage advantage will exist according to the relative distance from the carriage 38 to the bolt 52, compared to the distance from the bolt 52 to the pivot point of the brake assembly 20.

Thus, a user may apply greater than the user's weight, due to the leverage advantage, to the braking of the trolley 10. Alternatively, a user may weight completely the tether 148, thus retrieving the carriage 38 to a position suspending the user below or behind the bolt 52, and thus completely removing any dynamic braking effect.

In addition to the dynamic braking process and assembly described hereinabove, a trim brake may be included in the trolley 10. In order to provide trim braking, the brake assembly 20 may include a housing 260 supporting a slide 262 moving vertically therewithin. Meanwhile, a saddle 264 may connect to the housing 260 providing a second slide 266 within the saddle 264. The slide 266 may be a fabrication of multiple pieces. In some embodiments, the slide 266 may be a single monolithic piece.

In the illustrated embodiment, an adjustment 268 provides the ability to adjust the slide 262 vertically within the housing 260, thus placing the brake pad 88 underneath the cable 12 at a greater or lesser normal force with respect to the cable 12.

Similarly, the adjustment 270 may adjust the pressure of the upper slide 266 against the top side of the cable 12, by moving the slide 266 with respect to the saddle, in a downward direction.

As can be seen from the illustrations of FIGS. 5-9, the lower slide 262, and the upper slide 266 may both provide their own equal and opposite normal forces in opposition to one another, when no user weight is contributing to the lower slide normal force. Accordingly, the two slides 262, 266 clamp the cable 12 therebetween. Accordingly, each being provided with suitable braking materials, the slides 262, 266 may be adjusted by a user operating the respective adjustments 268, 270, in order to trim the braking force, the frictional drag force operating parallel to the cable 12, as a result of the normal (e.g., radial) clamping force exerted by the respective slides 262, 266 against the cable.

In the illustrated embodiment, the housing 260 may include a base 272 fastened securely. This is typically in rigid relationship, although not absolutely required, with respect to plates 274 forming the sides 274 of the housing 260. Each of the side plates 274 may be provided with a slot 276. The slot 276 is elongated in the vertical direction in order to provide space for the pivot bolt 162 of the mount 158 to slide up and down, substantially freely, with respect to the plates 136, but actually controlled by the adjustments 268, 270. Thus, the bolt 162 passes through the slot 276, the bolt 162 and its corresponding nut capturing the plates 274, gliding vertically along and restraining them from moving laterally away from the frame 14.

The slide may be formed as a single piece or multiple pieces. In the illustrated embodiment, the slide 262 is made having one principal piece, having legs 278 formed contiguously with an upper deck 280, then mounted to a base 288 by fasteners 289. Thus, the slide 262 is rigidized by the snug securement of the base 288 to the legs 278, and the monolithic fabrication of the deck 280 with the legs 278. In alternative embodiments, the deck 280 may be fabricated and connected to the legs 278. Nevertheless, in the illustrated embodiment, it is an advantage that the upper surface of the deck 280 may be completely smooth, and not be interrupted by fasteners, or countersunk in order to accommodate fasteners.

At the front and back edges of the plates 274, a cradle 282 or a cradle end 282 may support any forces operating in an axial direction, defined with respect to the orientation of the cable 12. For example, the cradles 282 capture the brake pad 88 or the brake shoe 88 used in dynamic braking. The brake pad 88 may be formed in a V shape in order to accommodate multiple sizes of cable. In certain embodiments, the brake pad 88 or brake shoe 88 may thus accommodate a wide variety of cable diameters without replacement. In other embodiments, the brake pad 88 may be formed to fit best a specific size of cable 12.

In certain embodiments, the brake pad 88 may be provided with markings, cuts, or the like, operating as wear indicators 284. Thus, as shims 286 are added between the deck 280 and the brake shoe 88 or brake pad 88, the wear indicators marks 284 will be elevated to become more visible through the V-shaped opening in the cradle 282. Accordingly, when the bottom of the worn portion of the brake pad 88 begins approaching the wear indicators 284, a maintenance technician can see immediately that replacement is in order.

The adjustment 268 or adjuster 268 may include a knob 290 or other actuator 290 operating to rotate a threaded rod 292. In the illustrated embodiment, the knob 290 turns the threaded rod 292, threaded through the base 272 of the housing 260. Accordingly, the fixture 294 may rotate freely with respect to the base 288 of the slide 262, resulting in displacement of the fitting 294 vertically, in accordance with the direction that the threaded rod 292 progresses through the base 272 of the housing 260.

By turning the knob 290, a user may move the threaded rod 292 upward or downward, thus moving the slide 262 upward or downward with respect to the housing 260. Ultimately, the slide 262, in turn, pushes on the brake shoe 88 and any intervening shims 286. This vertical movement adjusts the brake shoe 288 upward or downward with respect to the cable 12.

As a practical matter, the bolts 162, which fit into the spacer 296, but may also operate as the pivot bolt 162 having a nut on one end and a head on the other, may restrain the side plates 274 of the housing 260 from separating too far from one another and away from the frame 14. Likewise, the spacer 296 may be placed on the bolt 162 in order to space the plates 274 apart from one another. Accordingly, the spacer 296 may pass down the inside of the slide 278. In the illustrated embodiment, the spacer 296 may actually pivot within the dedicated aperture within the slide 278, thus carrying the pivot bolt 162 with the slide 278, and moving with respect to the side plates 274 in the slot 276 provided for the purpose.

The side plates 274 may be provided with a head 298 or head portion 298 sized to receive a drill drilling an aperture to receive a pin 300. The head portion 298 along with the pin 300 therethrough connects to a hinge portion 302 of the saddle 264. Accordingly, the hinge portion 302 and the head portion 298 connect by way of the pin 300 to form a hinge between the housing 260 and the saddle 264 of the capture 108.

The saddle 264 may be manufactured as a single solid piece. In an alternative embodiment, as illustrated in FIGS. 5-9, the saddle 264 may be fabricated in multiple pieces. The multiple pieces provide a certain convenience both in manufacture and in operation.

For example, in the illustrated embodiment, the saddle 264 may include a web 306 or a web portion 306 on each side of the cable 12 and thus connecting to the two respective head portions 298 of the side plates 274. Each of the web portions 306 may connect, opposite one another, to the crown 308. The crown portion 308 forms the top of the saddle 264. The web portions 306 may be hinged at their connections to the crown 308.

Accordingly, a pin 300 may be drawn out of the head portion 298 of the side plate 274, simultaneously withdrawal from the hinge portion 302 of the saddle 264. The web portion 306, thus released, may flip up about, or rotate about, the hinge portion 309 shared by the crown 308 and the web 306. Accordingly, a user may pull a pin 300, flip the web 306 up and away from the cable, the entire saddle 264 pivoting about the opposite pin 300 still in place. In this manner, a user may quickly remove or secure the brake assembly 20, and the capture 108 with respect to a cable.

In order to secure the brake assembly 20 to the cable 12, a user may simply pivot the saddle 264 into place, and secure the web portion 306 to the head 298 of the side plate 274. That is, the hinge portion 302 of the saddle 264 may be secured by a fastener 304 to the web 306, to form a part of the web 306. Typically, the hinge portion 302 is permanently and fixedly connected to the web 306 to move therewith.

In one embodiment, the shoe 310 or brake pad 310 may be a monolithic piece. In other embodiments, the shoe 310 may be formed in multiple parts. Accordingly, the slide 266 may be a single piece operating as the brake shoe 310. In other embodiments, the slide 266 may be made of a fabrication assembled of permanent and temporary parts. For example, the face 324 of the shoe 310 may be provided with a braking material that will wear, while a holder that receives it is permanent. In other embodiments, a single block of a suitable material may for the slide, wearing at the face 324 thereof.

In the illustrated embodiment, a chamfer may provide wear detection as a wear indicator 322 for the wear on the face 324 of the brake shoe 310. When the level of the face 324 passes through the boundary line or edge of the wear detection region 322, a maintenance technician can see at a glance that the brake shoe 310 is due for replacement.

In the illustrated embodiment, the slide 216 includes slots 320 in order to permit the fasteners 312 to guide the vertical motion of the slide 266. In this way, the adjustment 270 may move the slide 266 with respect to the saddle 264. For example, the saddle 264 operates as a frame, just as the housing 274 operates as a frame supporting the lower slide 278. Accordingly, rotation of the knob 314 rotates the threaded rod 316 fixed thereto.

The threaded rod 316 passes down through a fitting 318 in the crown 308 of the saddle 264. Just as the fixture 294 pushes on the base 288 of the slide 262, the threaded rod 316 pushes down on the slide 266, urging the face 324 of the brake shoe 310 against the cable 12.

Details of the embodiment of the trolley 10 illustrated in FIGS. 5-9 is contained in numerous manufacturing drawings included in Appendix A, attached hereto, and incorporated by reference herein. In one method of operation, a user may sit in a harness, saddle, bosun chair, or other support mechanism suspended from either the carriage 38 or the mount location 144b.

As described, a user may operate the dynamic brake feature of the trolley 10 by weighting or shifting the user's weight at will. The user weights the carriage 388 by the mount 144a, or the tether 148 over the roller 256. In yet another embodiment, a user may disconnect from the dynamic braking by connecting a harness, bosun chair, seat, or the like to the mount position 144b using the aperture 154.

Assuming dynamic braking is in use, a user may, prior to mounting the trolley 10 adjust the adjustment 268 (or adjustment 270, but control from below is easier if it has the options) to place the fasteners (acting as guides) in the vertically centered position with respect to the slots in which the fasteners move. Once the brake shoe 88 or 310 has been placed in the central position with respect to the housing 260 or saddle 264, a user may then adjust the opposite adjuster 268 or 270 to bring the opposite slide 266 or 262 with its associated brake shoe 310 or 88 against the cable as well.

To the extent that slack may be needed in the slot 276 for the bolt 162 to move vertically therein, shims 286 may be added according to the amount of wear existing in the brake shoe 88. In one contemplated method of use, a rider will adjust the adjuster 268 by rotating the knob 290 turning the threaded rod 292 upward or rotating it to move it axially upward with respect to its own central axis, thus driving the base 288 and supported slide deck 280 upward. Once the slide 266 in the saddle 264 is set down, the user can control the clamping or capture 108 force between the cable 12 and the opposed brake shoes 88. When the normal force and resulting drag force is sufficiently high, the brake shoes 88, 310 completely stop the trolley 10 with respect to the cable 12, against the force of gravity acting on the user seated in a suspended harness or seat under the trolley 10. A user can then "mount up," climbing into the harness, lowering oneself into the seat, or the like.

In order to begin moving, a user may release the lower brake shoe 88 by rotating the knob 290 to draw the lower brake shoe 88 away from the cable 12. A user may then set the trim braking by simply adjusting the knob 290 in order to provide the desired amount of fixed or biased trim braking provided by the brake assembly 20. Meanwhile, a user may control the dynamic braking by weighting and shifting weight, using the tether 148 as described hereinabove.

Upon arriving at a chair device, gondola, other lift device, or the like, a user may apply force to the tether 148, such as by stepping into an etrier or pulling on a handle connected to the tether 148 thus shifting as much of the user's body weight as desired to drawing the carriage 38 back toward the brake assembly 20. Upon coming to halt, a user may then tighten the knob 290 thus closing in with the appropriate normal force against the cable the clamping force between the two brake shoes 88, 310.

After servicing the lift device, whether a chair or a gondola, or other apparatus, typically by lowering occupants by a belayed rappel, a user may then pull the pin by drawing the handle 326. In some embodiments, the pins 300 may be configured not to completely leave the head 298 of the side plates 274. Once the pin 300 is clear of the hinge portion 302 of the saddle 264, the saddle 264 may be moved out of the way and the trolley 10 can be removed from the cable 12.

Thereupon, the user, secured by some other anchor, such as climbing carabiners and other equipment, may release the trolley 10 from the cable 12. The user may place the sheave 30 on top of the cable, down hill from the lift device serviced, close the bale assembly 68, flip the brake assembly saddle 264 over the cable, and replace the pin 300. The pin thus locks the saddle 264 to the housing 260. They user may adjust or readjust the adjuster 268 to alter the trim clamping force exerted by the two brake shoes 88, 310. Now the user may repeat the process of dynamic braking down the cable 12 to the next location.

In a similar fashion, a user may travel on a canopy tour made up of segments of catenaries 12 (suspended cables 12) passing from station to station. Accordingly, a user may stop, take pictures, watch wild life, and then release the bias or braking by turning the knob 290. The user simply reaches up and turns the knob, and continues on.

Thus, in general, setting the bottom adjuster 268 in the center, mounting the unit on the cable, locking the pin 300 into the head 298 and the hinge 302 will secure the capture 108 to the cable 12. Thereafter, the user may tighten the top adjuster 270 in order to position it. typically clamping the trolley 10 in a fixed position, before weighting the trolley 10 by putting oneself into the harness suspended therefrom as described hereinabove.

In one embodiment, the top adjuster 270 may always be used last with the lower adjuster 268 being set in the center thereof, in order to provide plenty of distance for trim adjustment. Thus, in this method, the top adjuster 270 is tightened sufficiently to bring the trolley 10 or maintain the trolley 10 in full arrest with the weight of the user applied. Thus, the user then lowers onto the trolley 10, where loosening the lower adjuster 268 slightly, actually, often a fraction of a turn, will permit the user to move the trolley 10.

By weighting the tether 148 with a stirrup, such as an etrier, the user can provide dynamic braking Loosening the adjuster 268 sufficiently to provide dynamic braking control, some desired amount of background trim braking may be set as a constant effect.

A user may provide a trim braking force to accommodate substantially any angle of cable 12 encountered. In certain embodiments, a user may apply dynamic braking by turning the adjuster 268. Nevertheless, in one presently contemplated embodiment, the speed and reaction of a user are well suited to drawing the tether 148 by means of a handle, an etrier, or the like.

Referring to FIGS. 10-13, while continuing to refer generally to FIGS. 1-23, the rolling surface 356 of a sheave 30 in accordance with the present invention may have any suitable profile. In selected embodiments, the profile of the rolling surface 356 may match the curvature of the cable 12 on which the sheave 30 will travel. In other embodiments, the rolling surface 356 may be formed as a "V." A profile in the shape of a "V" may ensure that a sheave 30 will track smoothly and predictably on cables 12 of various diameters.

The contacting surface of a brake pad 88 (i.e., the surface that contacts a cable 12) may have any suitable profile. As with a sheave 30, the profile of the contacting surface may match the curvature of the cable 12. Alternatively, the contacting surface of a brake pad 88 may be formed as a "V," enabling a brake pad 88 to engage cables 12 of various diameters with consistent results. As the brake pad 88 wears, it simply conforms better to the size and shape of the cable 12 to which it applies force. As it wears, surface pressure reduces according to the law that braking force is equal to normal force times the coefficient of friction.

In selected embodiments, a capture 108 in accordance with the present invention may include a substantially rigid bail 358 secured at each end by a bail mount 360. In certain embodiments, a pin 362 may form the connection between each end of a bail 358 and the bail mount 360 corresponding thereto. When one pin 362 is pulled, the bail 358 may pivot about the other pin 362, allowing the bail 358 to engage and disengage a cable 12. The pins 362 may be formed with detents, resisting inadvertent removal from the corresponding bail mount 360.

A bail 358 may include a trim brake. For example, a bail 358 may be formed with two cheek plates 364 positioned on either side of an interior spacer 366. An adjustment mechanism 368 (e.g., thumbscrew 368, lever 368, cam 368, or the like) may extend down through the interior spacer 366 or otherwise engage a slide 110. Slots in the slide 110 may enable it to move in the transverse direction 11c with respect to (e.g., away from) the bail 358. The adjustment mechanism 368 may move the slide 110 into and out of contact with the cable 12. The adjustment mechanism 368 may also control the force urging the slide 110 against the cable 12.

A trim brake formed as part of a bail 358 may permit a user to fine tune the overall drag produced by a trolley 10 in accordance with the present invention. Additionally, a trim brake may be adjusted to be, or otherwise provide a trolley with, a "parking brake." Accordingly, once a user stops at a desired location on a cable 12, the user may adjust the adjustment mechanism 368, clamping the trolley 10 to the cable 12 and preventing further movement of the trolley 10 with respect to the cable 12.

The contacting surface of a slide 110 (i.e., the surface that contacts a cable 12) may have any suitable profile. As with a sheave 30 or brake pad 88, the profile of the contacting surface of a slide 110 may match the curvature of the cable 12. Alternatively, the contacting surface of a slide 110 may be formed as a "V," enabling the slide 110 to engage cables 12 of various diameters with consistent results.

In certain embodiments of an apparatus and method in accordance with the invention, it is not required for the slide 110 to include braking material in contact with the cable 12. It may act as a clamp pulling the brake pad 88 into more forceful contact with the cable. The slide 110 may even include bearings rolling along the cable 12. In such an embodiment the slide operates as a normal force applier, only applying the brake pad 88 for drag.

Nevertheless, braking material in any shape, including a "V" shape may be secured, captured, or otherwise made to slide along the cable 2. The slide 110 may provide smooth riding and control wear as the slide 110 moves with respect to the cable 12. In some embodiments the side 110 may be made substantially completely of a braking material.

Whether the slide provides normal force only, accepts wear, or acts as a brake shoe itself, it may still act to provide trim braking Likewise, it may supply "park" braking for a user desiring or needing to stop at a location to work. In either event, and in all those configurations the slide may provide a "constant" or continual braking as desired.

Referring to FIGS. 14-23, while continuing to refer generally to FIGS. 1-23, a trolley 10 riding a cable 12 may include several basic components. Those components may be arranged in various combinations and configurations. For example, each of the brake assemblies 20 illustrated in the figures herein may be connected to a frame 14 adapted to that purpose. Likewise, a sheave mount 28 may be connected to a frame 14.

Meanwhile, a carriage 38 may be assembled to ride along the frame 14, to control the leverage exerted on the brake assembly 20 by the weight of a user suspended from the carriage 38 (e.g., at user mount location 144). Thus, virtually each trolley 10 illustrated herein may operate with any suitable frame 14, any suitable brake assembly 20, suspending a user from a cable 12 on which a sheave 30 rolls, rotatably mounted to a sheave mount 28 suspending the frame 14.

Typically, a carriage 38 may be moved along the longitudinal direction 11a of the frame 14 by a user weighting a tether 148. Thus, as a tether 148 receives more of a user's weight, the carriage 38 moves toward the first end 16 of the trolley 10 transferring weight to the frame 14 through the roller 256. Thus, the "deadman position" or default position is for the carriage 38 to roll toward the second end 18, applying maximum leverage to the brake assembly 20 against the cable 12 increasing friction.

An operator, even a user, may arrange the components of a trolley 10 according to the mission or operation desired. For example, the embodiments of FIGS. 1-4 involve a dynamic relationship between the weight 34 of a user acting on the user mount location 144 to apply more braking of the lower brake shoe 88 against the cable 12 by the increased leverage near the second end 18 of the frame. Greater leverage applies more force on the cable from the brake pad or shoe 88.

Meanwhile, as in FIGS. 4-13, a sheave 30 or pad 88 may be U-shaped or more V-shaped. The U-shape may be best for one size of cable 12. In contrast, if a user expects to ride various diameters of cables 12, then the V-shaped sheave 30, shoe 88, or both may provide a better performance. Similarly, even the brake shoe 310 may be formed to have a U-shaped, a V-shape, or another shape, according to functionality demanded by the tasks of a user. Similarly, the trim system (trimmer), providing upper and lower adjustments to a background or biasing brake force imposed by clamping of the lower brake shoe 88 and the upper brake shoe 310 against the cable 12 may be adjusted as desired and necessary. Meanwhile, the embodiment of FIGS. 14b-23 may receive trimming from single or multiple (top, bottom) adjusters 290 or actuators 290.

Thus, in general, it is virtually impossible to illustrate every configuration with every component in every possible permutation and combination in which the components of the trolley 10 may be assembled. Nevertheless, for virtually any option, a frame 14 may be connected with a brake assembly 20 and carriages 38 suspending a user. Thus, a trolley 10 may ride on a cable 12, suspended from a sheave 30 riding on the cable 12, a sheave mount 28 capturing the sheave 30, and supporting rotation thereof along the cable 12. A carriage 38 may be set at a fixed position or a movable position, and may be moved "uphill" by a tether 148 weighted by a portion of a user's weight, thus unloaded from the user mount location 144.

Dynamic control results immediately in response to the hands of a user drawing on the tether 148 by some actuator or handle. A user may preset the range of such braking in order that a novice may ride safely without operational skill. On the other hand, an expert rider may use or ignore the tether 148 and may use also, or instead, top trim, bottom trim, both, or none. Thus, not every component is shown in every figure. Not every option is shown in every figure. The need for clarity would not be served by cluttering every drawing with every option.

Referring to FIGS. 14-23, a trolley 10, in general rides along a cable 12 on a sheave 30 rotating with respect to a sheave mount 28. The number of sheaves 30 is optional, on the one hand, but has been shown to improve the dynamics, and the loading upon braking or terminal velocity absorption when a single sheave 30 is mounted, on a sheave mount 28, which sheave mount 28 is in turn pivotable about a bolt 52 or axle 52 with respect to the frame 14. Similarly, a brake assembly 20 may pivot around a connecting bolt 162 in order to support or provide continuing alignment between the brake shoe 88 and cable 12.

Figure 14A:
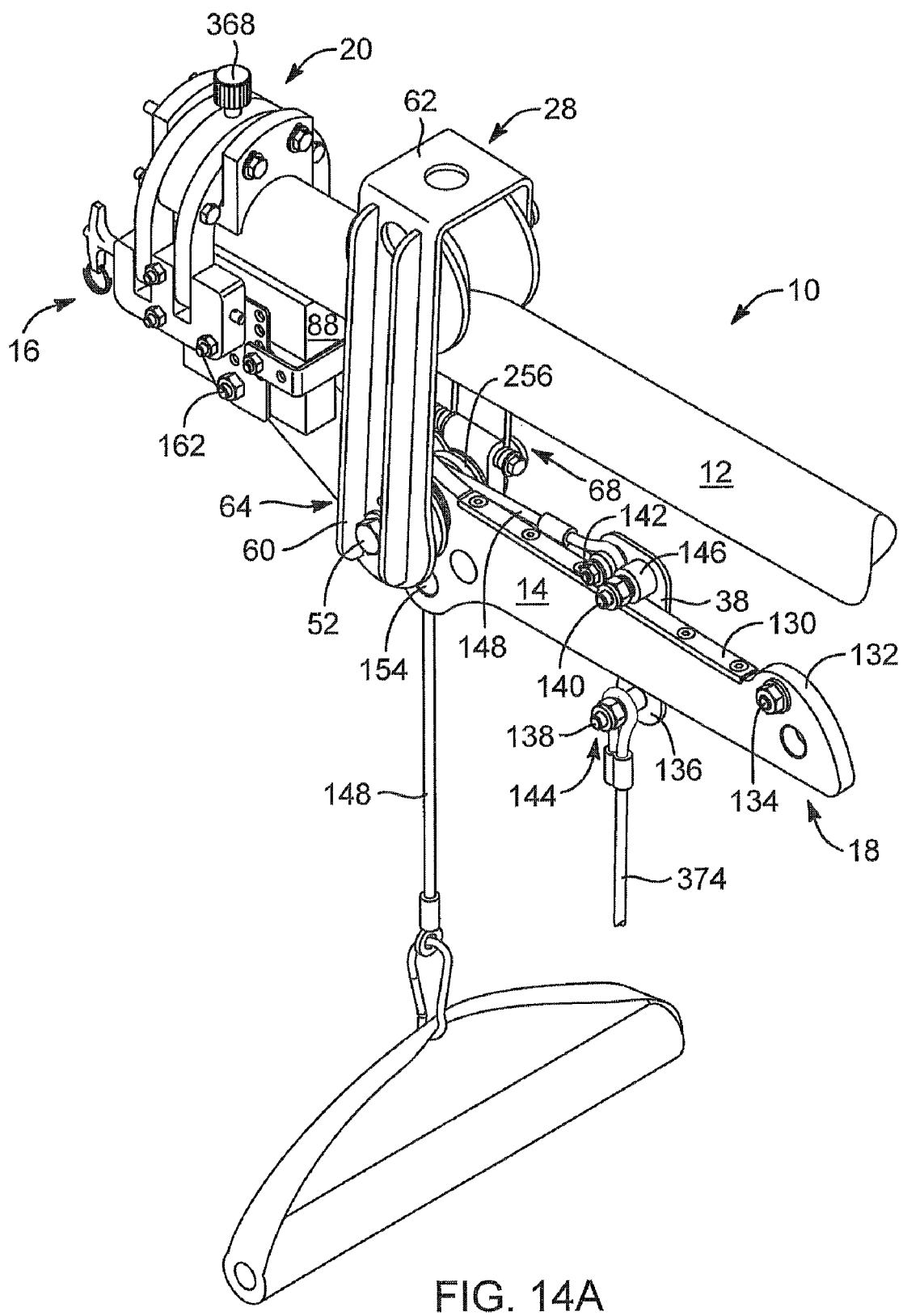
FIG. 14 is a front quarter perspective view of the trolley of FIG. 10, showing the suspension line for supporting a user, along with the tether and handle for controlling leverage of a user's weight with respect to the dynamic braking force exerted by the trolley brake assembly.
FIG. 14B is a front quarter perspective view of a trolley having an alternative embodiment of a brake assembly, relying on a lower trim adjustment, and illustrating various types of handles or engagement mechanisms for a user to operate the tether controlling leverage of a user's weight suspended from the carriage in a harness.
FIG. 14C is a front quarter perspective view of the trolley of FIG. 14B, illustrating one embodiment of a harness for suspending a user therefrom.
Figure 14B:
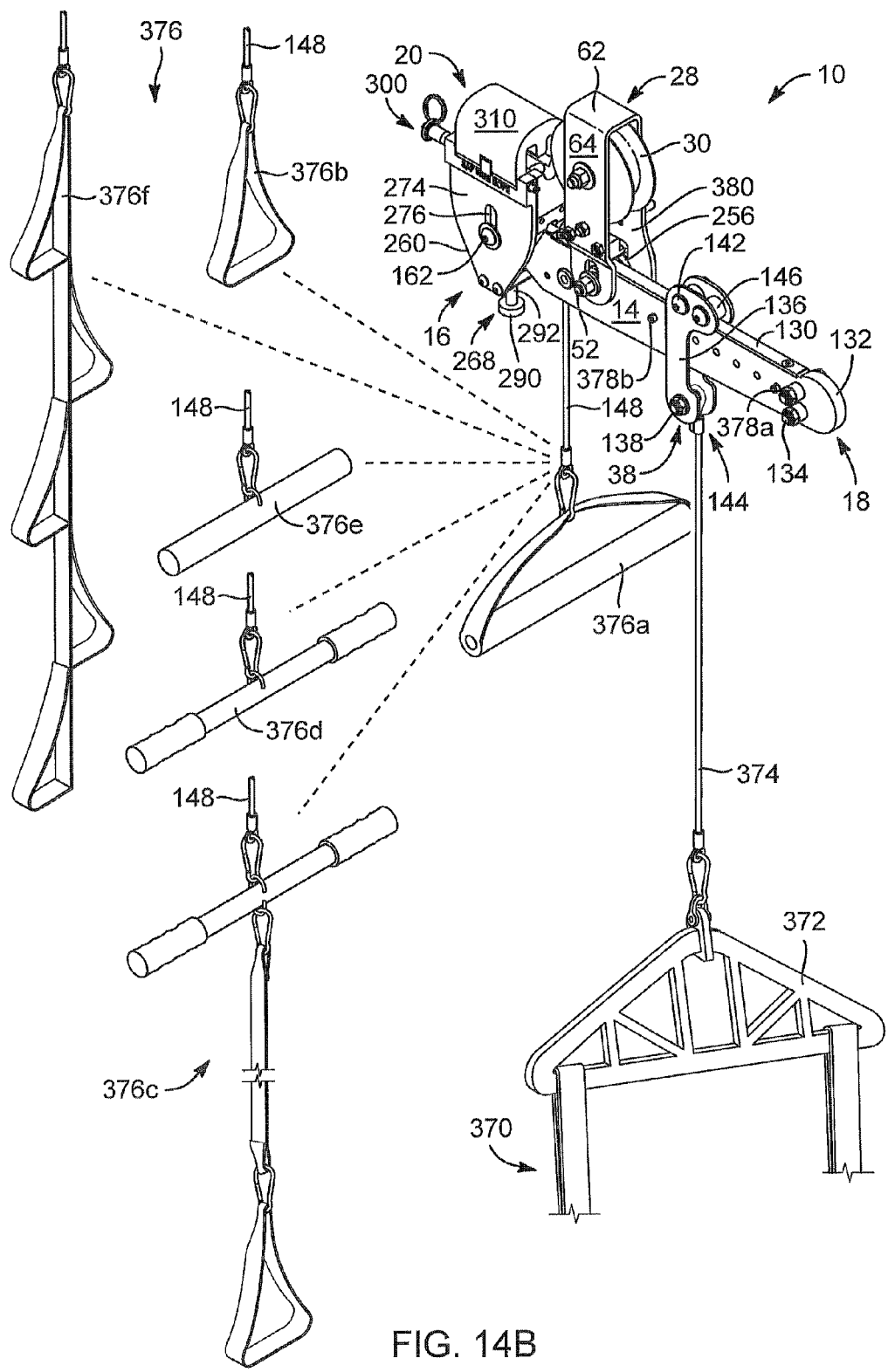

Referring to FIG. 14B, a trolley 10 in this embodiment may benefit from a single trimmer mechanism trimming the braking load exerted by the brake assembly 20. For example, the upper shoe 310 may operate in many circumstances as a capture 108. Nevertheless, the upper shoe 310 may be formed of any suitable material such as ultra-high-molecular-weight polyethylene, a fiber-reinforced phenolic, or even a metal. Nevertheless, in certain embodiments, the upper pad 310 or upper brake shoe 310 need not apply any braking. It may simply provide an anvil 310 against which the lower brake shoe 80 may be juxtaposed, clamping the cable 12 therebetween.

Thus, in one embodiment, the upper shoe 310 may be released to pivot about the bolt 312, by having a user remove the locking pin 300. In this way, the shoe 310 may be flipped open, with the cable then free to be removed. Similarly, the sheave 30 may be released from the cable by opening a bail 74, or gate 380.

In the illustrated embodiment, the carriage 38 may be configured to slide or roll along the rail 130 of the frame 14. The weight of a user acting on the line 374 tends to urge the carriage 38 downhill toward the second end 18 where the leverage creating braking force will be maximized.

Similarly, a user may shift distribution of one's weight between the harness 370 or seat 370 and the handle 376 or weight shifter 376. The more weight is supported by the harness 370 the greater the braking. Meanwhile, pins 378a and 378b may be set in the frame 14 in order to limit the maximum and minimum braking or the maximum and minimum leverage controlling braking applied by the weight of a user suspended from the carriage 38. However, the more weight is applied by the user to the weight shifter 376 the more the carriage 38 moves toward the brake assembly 20, drawn by the tether 148, thus shifting weight to the frame without leverage to the brake 20. Again, the adjuster 290 or actuator 290 may be turned to apply more force between the lower brake shoe 88 and the cable 12. When fully assembled, with the pin 300 in place, the upper shoe 310 holds the cable 12 in proximity to the lower brake shoe 88, thus permitting a clamping force controlling quite precisely the frictional force applied by the brake shoe 80 to the cable 12. Unlike the embodiment of FIGS. 5-14A, which contain a top adjustment with control by an adjustment knob 314, 368. Thus, the embodiment of FIGS. 14B-23 relies on a single adjustment mechanism 268 operating from the underside of the brake assembly 20.

Figure 14C:
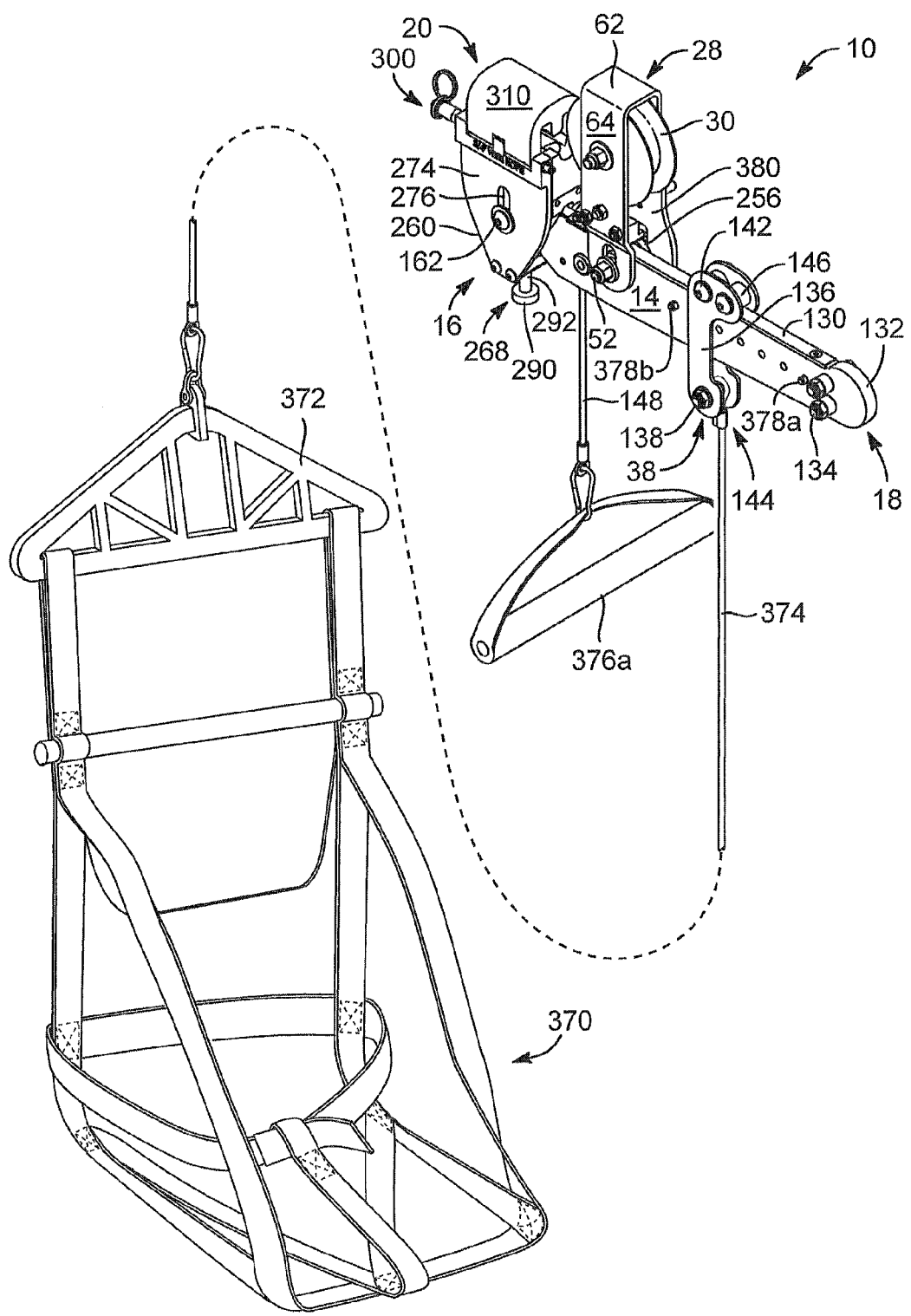

Referring to FIG. 14C while continuing to refer generally to FIGS. 1-23, in general, a harness 370 or seat 370 may be suspended from a spreader bar 372 or support bar 372. The spreader bar 372 may connect various points on the harness 370 to a single line 374 or multiple lines 374 suspending the harness 370 from the trolley 10 such as to the carriage 38. Typically, the weight shifter 376 or the handle 376 used to shift weight may be connected to a tether 148 around the roller 256 in order to unweight the loading from the line 374 onto the frame 14 as weight is increased on the tether 148.

In certain embodiments, the handle 376 or weight shifter 376 may operate only between preselected values, by having pins 378 (e.g., the pins 378a, 378b) limiting the maximum and minimum leverage the line 374 connected to the carriage 38 may assert on the brake assembly 20. Typically, the handle 376 or weight shifter 376 may be above, and slightly behind the user. With a user seated in the harness 370, the handle 376 may be effectively directly overhead. Various forms of handles 376a-376f may be used. For example, a simple handle connected to a fabric sling or the like may be embodied as the handle 376a or a stirrup 376b. A user may use a tether 148a, brought in front of the user, a foot being placed in the stirrup 376b to shift weight from the harness 370, to the stirrup 376b.

In other embodiments, a handle 376e for a single hand may be grasped with the fingers placed astride the connection to the line 148 or tether 148 may rely on a single hand to pull on the handle 376e. A user may rely on a combination of a handle 376a, 376d, 376e for one or more hands connected by a sling 376b or stirrup 376 for the foot of a user. Thus, a user applying weight by both hands and feet unloads the harness 370 and reduces leverage.

As an alternative to a stirrup 376d, or even in the combination 376c that relies on both a handle bar and a stirrup, an etrier 376f may be used. Placing one or more feet in the stirrups of a etrier 376f a user may apply weight thereto thus relieving weight on the harness 370, drawing the carriage 38 with the tether 148 toward a reduced braking leverage and harness 370 weighting at a position closer to the sheave mount 28, and the brake assembly 20. The harness 370 or seat 370 may be a "bosun's chair," a climbing harness used by mountaineers or workers. Varying degrees of leg support and back support may be built into the harness 370 or seat 370 of an apparatus in accordance with the invention.

Figure 15:
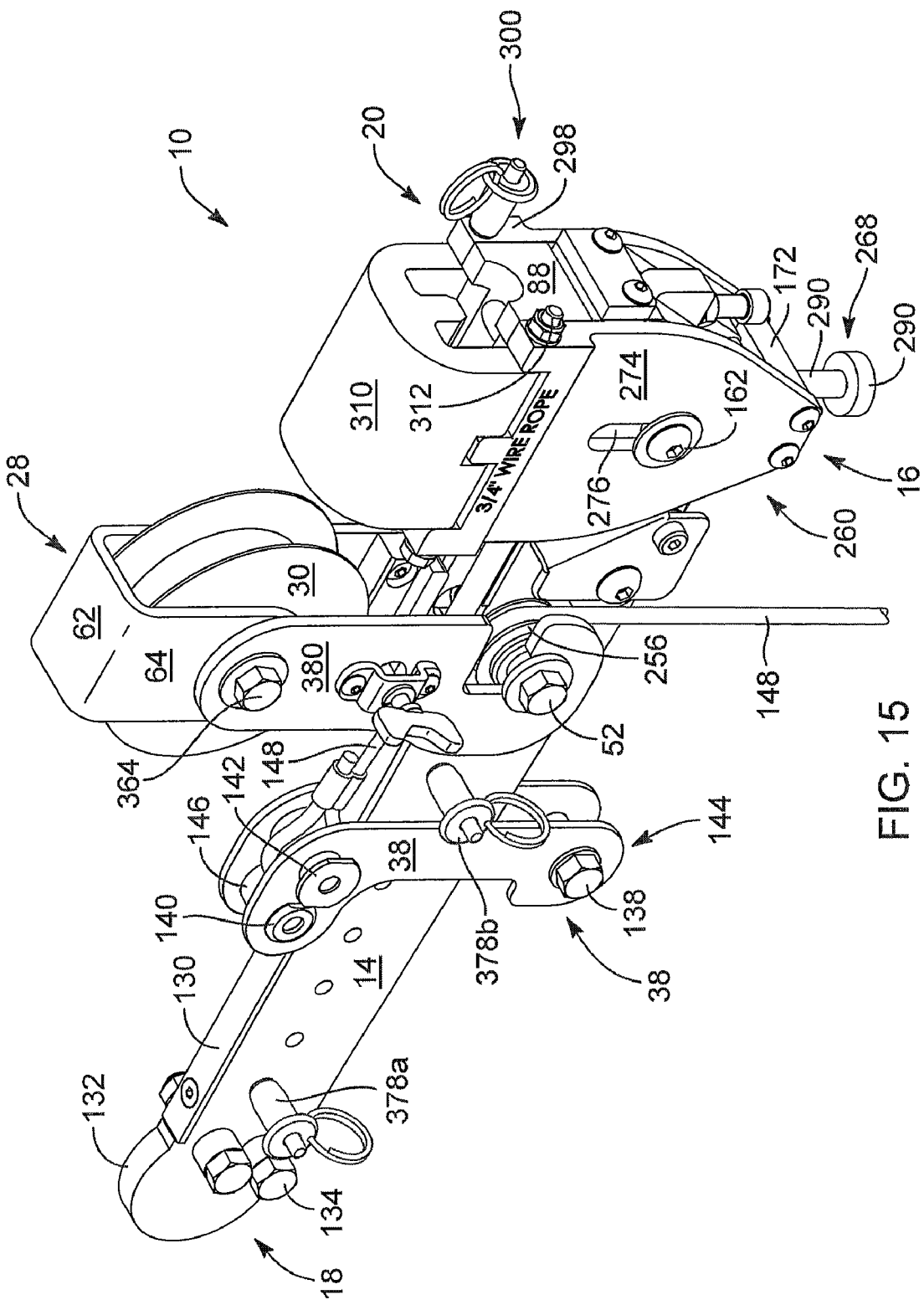
FIG. 15 is a rear quarter perspective view of the trolley of FIG. 14B.
Figure 16:
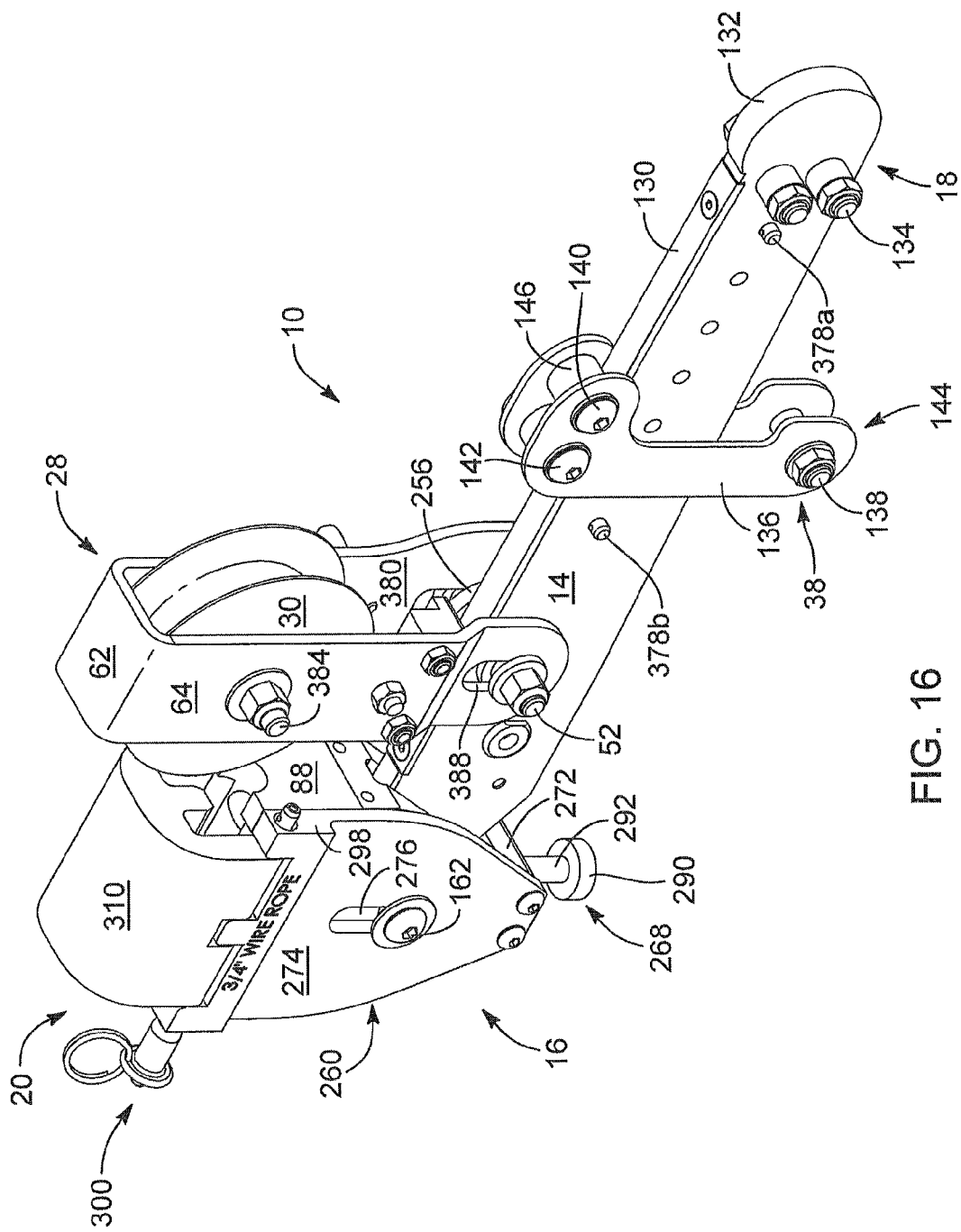
FIG. 16 is a front quarter perspective view of the trolley of FIG. 15.
Figure 17:
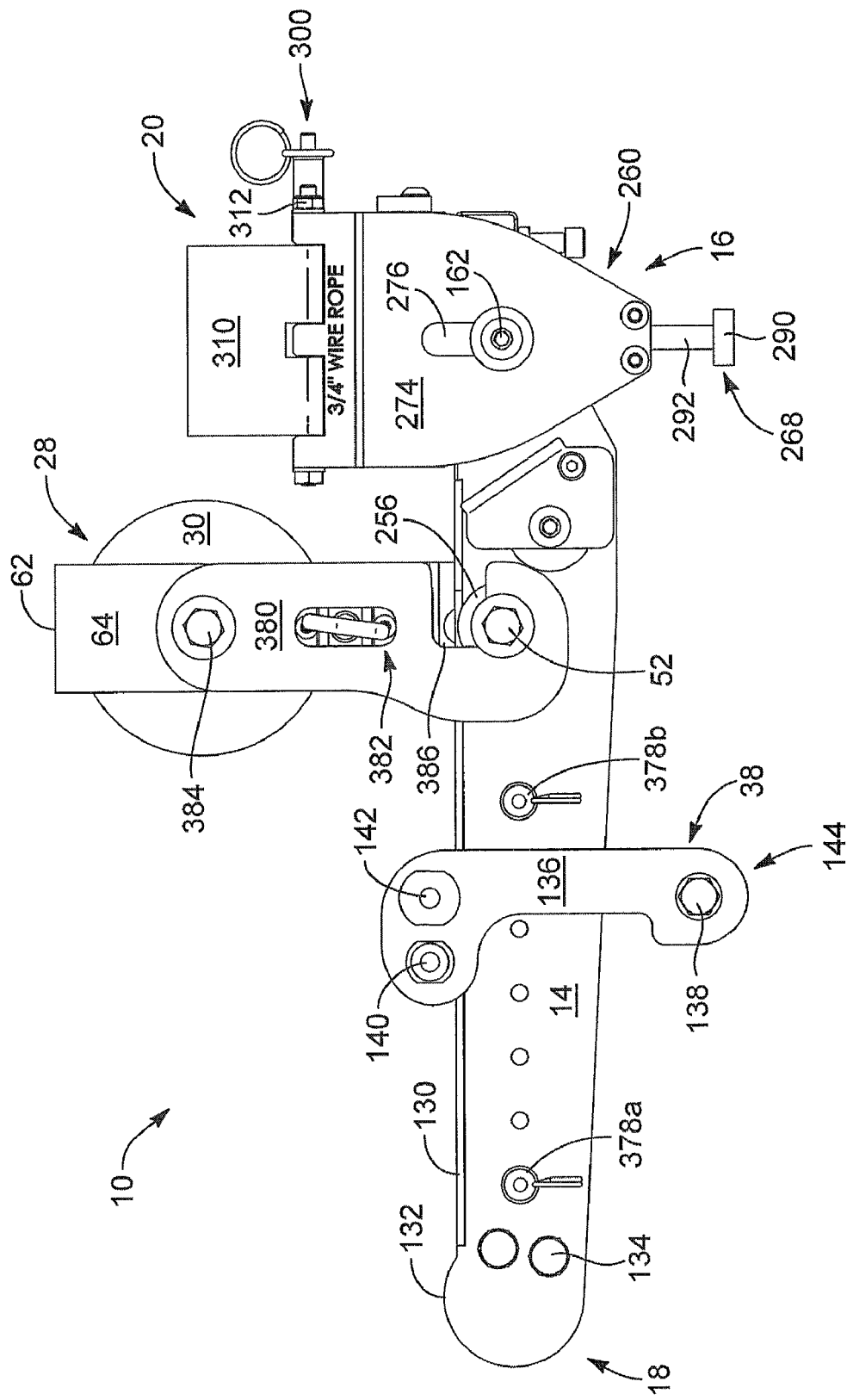
FIG. 17 is a right side elevation view (left, from a typical user or rider position) of the trolley of FIG. 15.

Referring to FIG. 15, and to FIGS. 1-23 generally, one advantage of the pins 378a, 378b is the ability to bracket the braking force applied by the brake assembly 20. For example, a user may determine that the particular angle or range of angles of a particular suspended cable 12 needs to have at least some minimum braking, fixed by the pin 378b secured to the frame 14. Likewise, a user may determine that a maximum braking should be limited, and thus may set the pin 378a to limit just how much leverage is applied to the brake assembly 20 against the cable 12.

Referring to FIGS. 15-23, while continuing to refer generally to FIGS. 1-23 a trolley 10 in accordance with the invention may be operated by a rider on a cable tour such as a "canopy tour" through a forest. A trolley 10 may have specific level of force applied to braking the trolley 10 along the cable 12. A user or operator may simply tighten a knob 290 of an adjuster 268, clamping a cable between the upper shoe 310 and lower shoe 88. Thus, a user may completely stop the trolley from moving with respect to a cable 12. A user may then enter a harness 370, strap in, and may then release the adjuster 268, reducing the force or pressure exerted by the lower brake shoe 88 on the cable 12.

In certain embodiments, a user may operate entirely without loading the tether 148. For example, if a user harness 370 is suspended at a distance that makes the knob 270 of the adjuster 268 readily accessible, a user may simply dial the amount of braking desired and selectively move, slow, or come to a stop. Likewise, a user may draw on a handle 376 connected to the tether 148, thus minimizing braking when desiring to move. Accordingly, after moving a certain distance, a user may release the handle 376 and the tether 148 attached thereto, permitting the carriage 38 to return to a maximum braking position, at a stop, or a very slow speed. Thereafter, a user may basically tie off or fix the trolley 10 with respect to the cable by tightening the knob 290, causing the adjuster 268 to push the brake shoe 88 against the cable 12, which cannot move away because it is captured by the upper shoe 310.

Referring to FIGS. 17-22, in particular, while continuing to refer to FIGS. 1-23, generally, the sheave mount 28 may include a gate 380 rather than a bail 74. In the illustrated embodiment, the gate 380 may rotate with respect to one side 64 of the sheave mount 28. A lock 382 may maintain alignment of the gate 380 with the sides 64 of the sheave mount 28. A bolt 384 operating as an axle 384 may carry the sheave 380, and the gate 380 may rotate about the bolt 384. Thus, the gate 380 may have a slot 386 provided into which a bolt 52 may be slid. The slot 386 may be open to provide entrance of the bolt 52 first longitudinally with respect to the trolley 10, and then transversely 11c to be failsafe.

Figure 18:
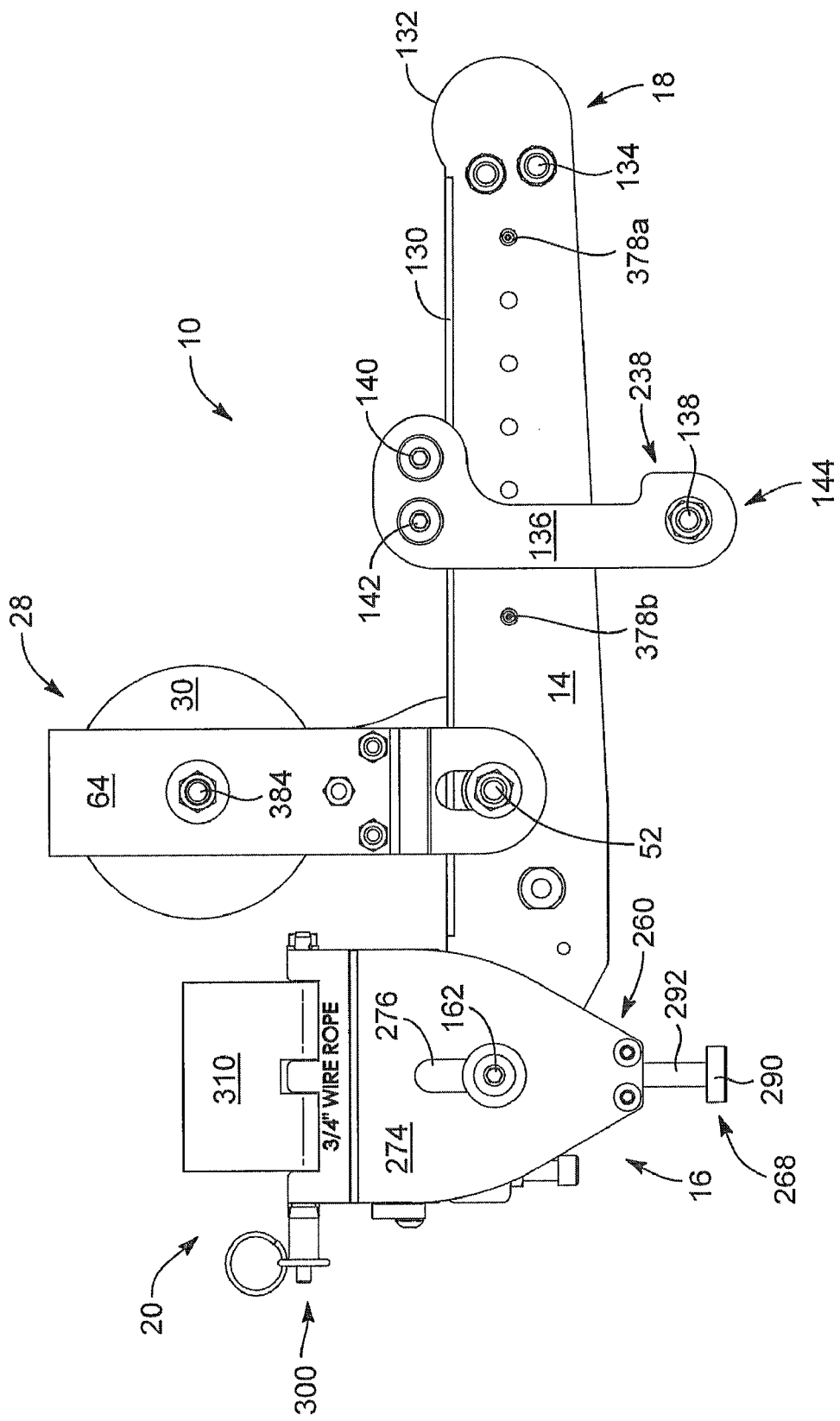
FIG. 18 is a left side elevation view (typically on a user or rider's right side) of the trolley of FIG. 15.

In FIG. 18, the slot 388 is closed, with the bolt 52 substantially captured in the slot 388 in a fully assembled state. To remove the trolley 10 from a cable 12, the loading or suspension load drawing the sheave 30 and sheave mount 28 away from the frame 14 may be released by removing a user from the harness 370. Thereafter, the sheave mount 28 may be freely moved, with respect to the bolt 52, by sliding sheave mount 28 downward, in a transverse 11c direction to position the slot 386 so the bolt 52 may be removed in a longitudinal 11a direction.

The gate 380 may be flipped or rotated about the axle 384 or bolt 384 supporting the sheave 30, exposing the cable 12 for removal from the sheave 30. Meanwhile, the pin 300 may be withdrawn, permitting the top shoe 310 to be flipped or rotated about the bolt 312, leaving it open for quick removal of the trolley 12 from the cable 12. This makes the trolley 10 in this configuration particularly adaptable to rescue work, canopy tours, and the like where the trolley 10 may be more frequently stopped, started, installed and uninstalled on a cable 12, even by the rider.

Likewise, when the trolley 10 has the gate 380 rotated open, and the top shoe 310 rotated to an open position, a cable may be set in, or the trolley 10 may be set on a cable 12 to have the sheave 380 riding on the top of the cable, and the lower brake shoe 88 riding below the cable. Thereupon, the brake top shoe 310 may be rotated closed, and the pin 300 replaced to secure the top shoe 310 in fixed relation to the housing 260 of the brake assembly 20. Likewise, the gate 380 may be rotated closed, the bolt 52 may slide first longitudinally 11a into the slot 386, and then upon weighting of the frame 14, by its own weight, or by the weight of user, the bolt 52 slides within the two juxtaposed slots 386, 388, thus further securing the gate 380 against opening.

Figure 19:
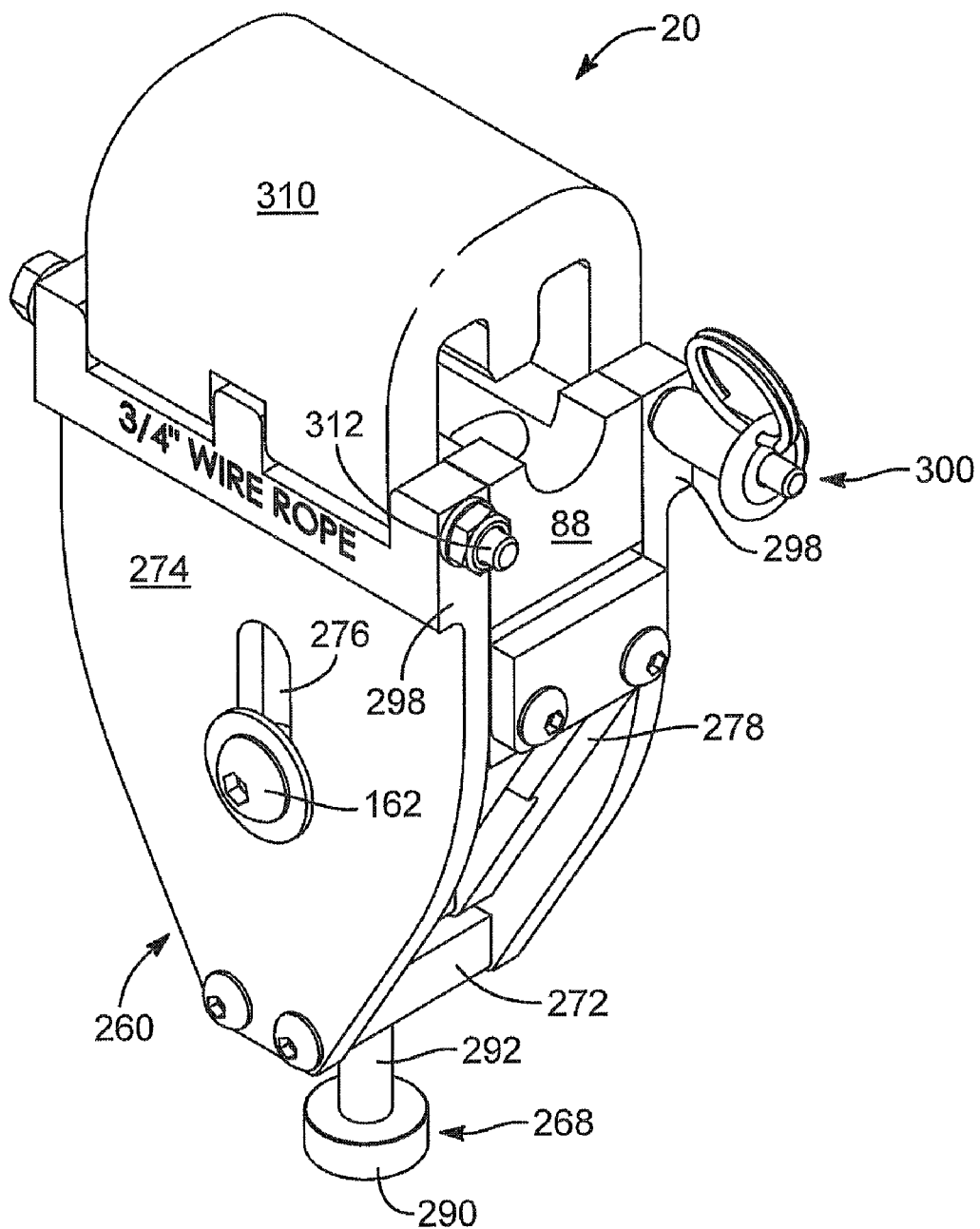
FIG. 19 is a rear quarter perspective view of the brake assembly of the trolley of FIG. 15.
Figure 20:
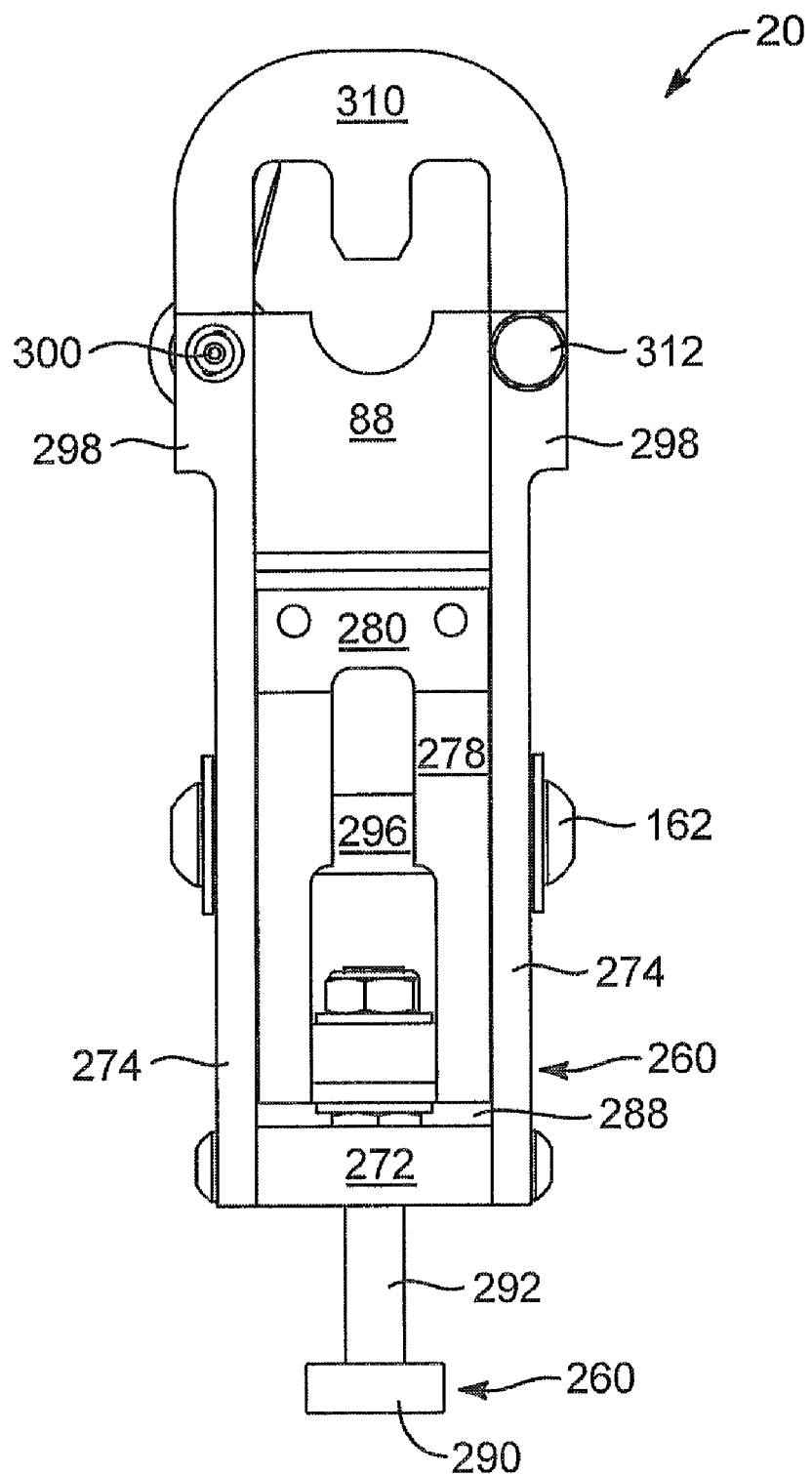
FIG. 20 is a front elevation view of the brake assembly of FIG. 19.
Figure 21:
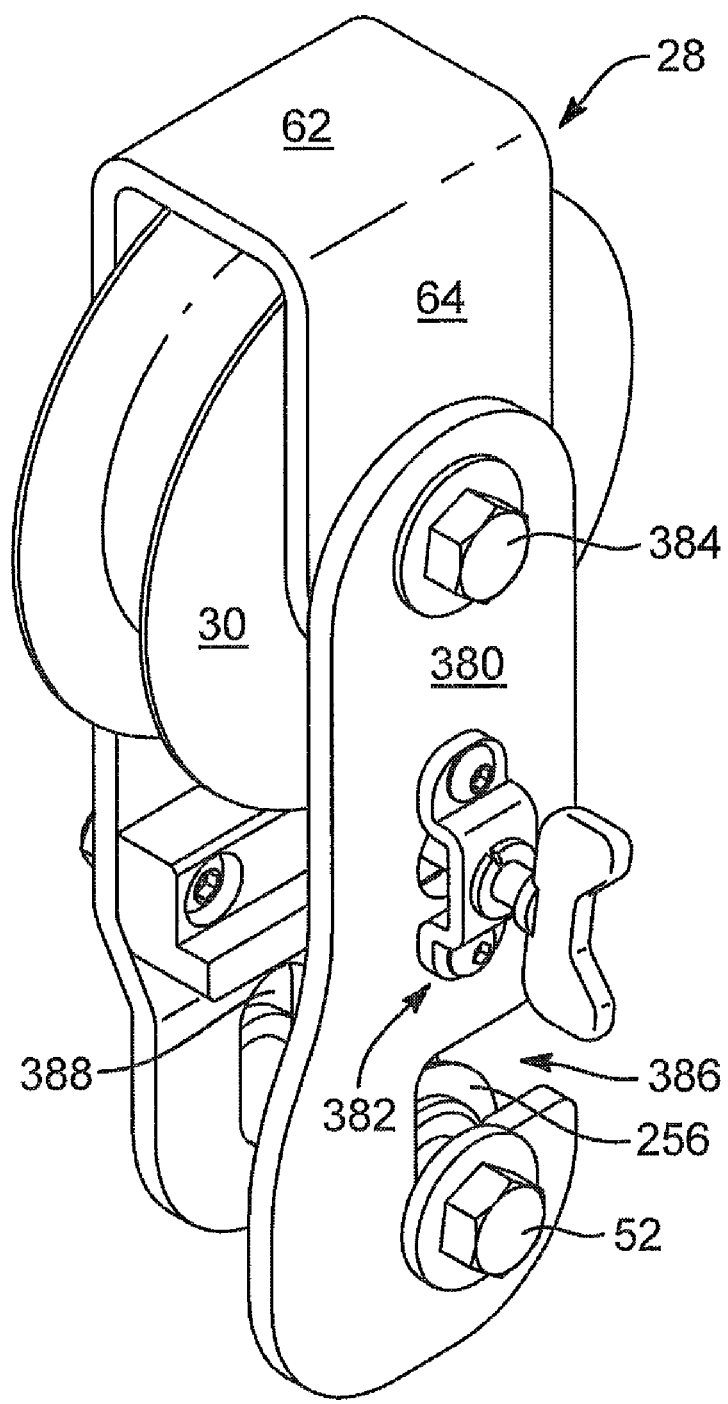
FIG. 21 is front quarter perspective view of one embodiment of a sheave mount and sheave, such as in the trolley of FIG. 15.
Figure 22:
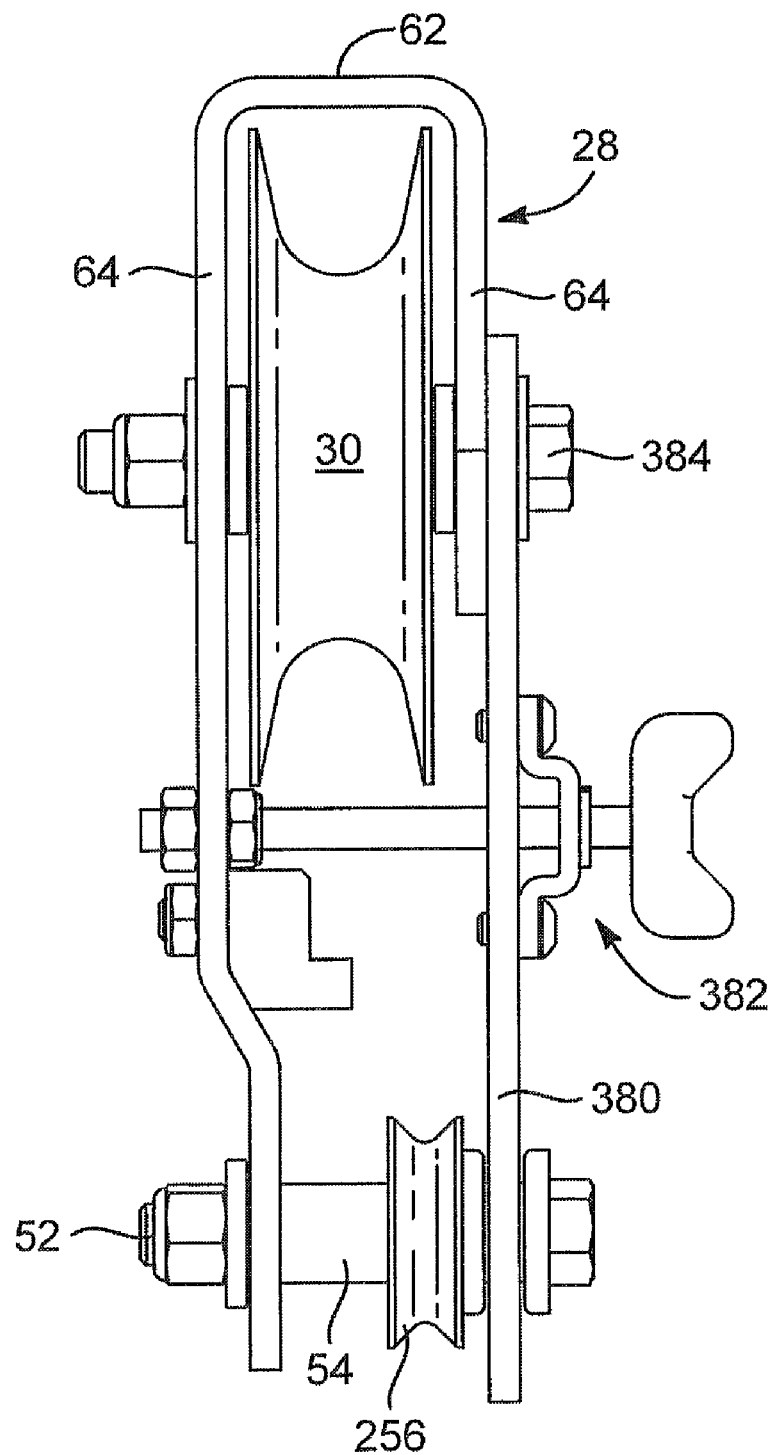
FIG. 22 is a front elevation view of the sheave mount and sheave of FIG. 21.

Meanwhile, a user may turn down a thumb screw or other actuator on the lock 382 in order to assure that the gate 380 does not rotate when the trolley 10 is in use. Referring to FIGS. 19-20 specifically, while referring generally to FIGS. 1-23, the brake assembly 20 may have a trim brake functionally by positioning the lower brake shoe 88 with the adjuster 268, by turning the knob 290 to clamp a cable 12 between the top shoe 310 or upper shoe 310 and the lower brake shoe 88.

Referring to FIGS. 21-22, and FIGS. 1-23 generally, the lock 382 may procure and secure alignment of the gate 380 against rotating off the pivot bolt 52. Nevertheless, the slots 386, 388, likewise assure that a weighted trolley 10 cannot be removed from a cable, nor remove itself, the pivot pin 52 or bolt 52 is captured and secured by the drawing of the sheave 30 away from the bolt 52, securing the gate 380 against rotation. Typically, the user may be suspended from a user location 144 in the frame 44 of the carriage 38 moving with respect to the frame 14. Nevertheless, in certain embodiments, a user may rely on the braking capacities of the trim function of the adjusters 268.

For example, a user may simply provide some degree of bias braking by adjusting the knob 290 and forcing the lower brake shoe 88 against the cable 12. Thus, there may be no need to suspend the line 374 with its support of the harness 370 or seat 370 from the carriage 38. In such an embodiment, or configuration, a user may elect to suspend the harness 370 by a line 374 threaded instead through an aperture 154. Such an aperture is illustrated in FIG. 14A, as well as in the embodiments of FIG. 3, FIG. 6, FIGS. 4-13, FIG. 23, and so forth.

Figure 23:
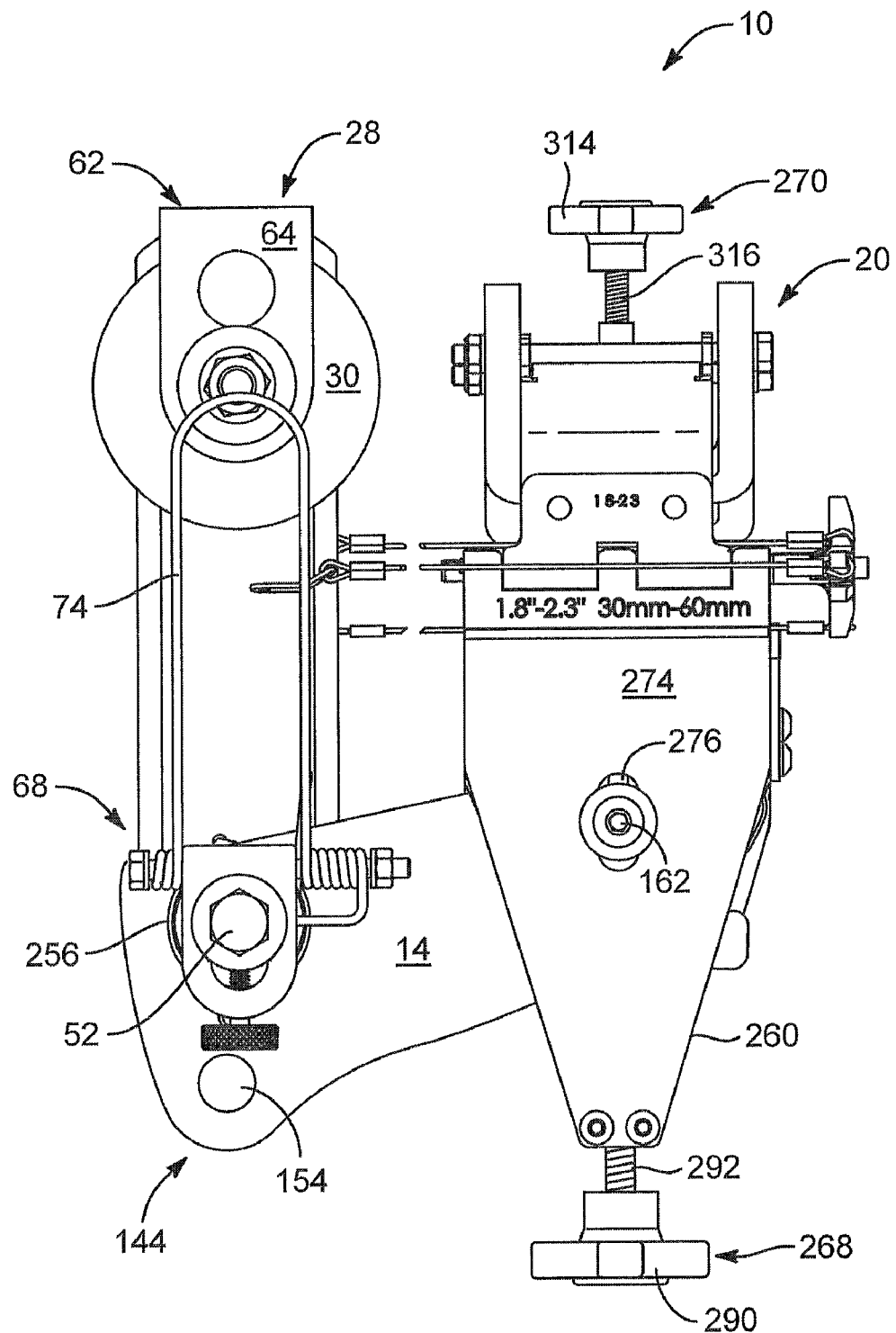
FIG. 23 is a side elevation view of an alternative embodiment of a trolley particularly adapted to low angles of decline, and thus absent the front lever arm of the frame.

If a user desires to rely entirely on trim braking, one can use the brake assembly 20 of FIGS. 14B-23, the brake assembly 20 of FIGS. 5-10, or some combination or subset thereof. For example, in the embodiment of FIG. 11, the brake assembly relies on a single top trim, the embodiments of FIGS. 14B-23 rely on a single bottom trim, and the embodiment of FIGS. 5-9 relies on both top and bottom trim. Thus, one may operate the apparatus of FIG. 23 exactly as described above for the previous embodiments. For example, the embodiment of FIG. 23 illustrates the same components and relationships as the embodiments of FIGS. 5-9. Nevertheless, referring to FIG. 23, one can rely on the brake assembly 20 of FIGS. 14B-23 or another.

Referring to FIG. 23, the trolley 10 illustrated herein may rely on any of the sheave mounts described hereinabove. Likewise, any of the brake assemblies 20 may be relied upon. Moreover, any of the frames 14 may be used. Nevertheless in the illustrated embodiment, the frame 14 has been shortened to remove the unnecessary leveraging length relied on in other configurations. In this embodiment, a user may simply set the trim as described hereinabove and suspend the line 374 from the aperture 154 as the new user mount location 144 becomes the aperture 154 instead of the carriage 38.

Thus, the apparatus and method of FIG. 23 provides a compact, lightweight, safe riding system for professionals who ride cables, particularly for rescue operations. Such an apparatus may be quickly connected and disconnected from a cable, and can be trimmed down to a full stop. This may support much greater weight than the weight of a user, or capable of supporting more weight, enabling the worker to, for example, operate to rappel skiers to the ground from a stalled gondola or chair lift. Meanwhile, the user can quickly disconnect and reconnect the trolley 10, moving it from above one gondola or chair assembly to the cable 12 beyond. A user with experience, particularly on a cable of known size with an adjustment made prior to beginning such a run, may control bias braking to slow a person. One may control trim braking even using the lower knob 290 of the adjuster 268 in order to speed up, slow down, or come to a stop.

Referring to FIG. 23, in particular, when cables have a comparably low angle of decline, the risk of a runaway trolley 10 is substantially reduced. Thus, the apparatus of FIG. 23 may be particularly useful in such circumstances. Whenever a user is not particularly skilled, such as a recreational or amusement riders, then the fail safe or "deadman" systems showing the longer frames with automatic leveraging and the like may be more suitable.

The present invention may be embodied in other specific forms without departing from its spirit or essential characteristics. The described embodiments are to be considered in all respects only as illustrative, and not restrictive.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. A trolley traveling along and suspending from a cable, the trolley comprising:
   a frame having a first end, second end, rail extending from proximate the first end to proximate the second end, and fulcrum spaced away from the first end toward the second end;
   a brake, comprising a first pad, connecting to the frame;
   a trimmer, having a second pad, positioned opposite the first pad;
   the trimmer, selectively adjustable by a user riding the trolley to provide a substantially continual clamping force by the first pad against the cable;
   a sheave mount connecting a sheave, rolling along a cable, to the fulcrum;
   a carriage having a user mount and selectively traveling along the rail;
   the carriage, selectively positionable along the rail by the user;
   the brake, dynamically controlled by the user by selectively distributing the weight of the user between the carriage and a tether moving the carriage toward the fulcrum of the frame.

2. The trolley of claim 1, wherein the first and second pads connect to the frame proximate the first end.

3. The trolley of claim 2, wherein the clamping force is adjustable continuously between a first force halting the trolley with respect to the cable and a second force releasing the trolley to roll freely along the cable.

4. The trolley of claim 3, wherein the sheave is connected to the fulcrum to exert force thereon in substantially a single direction at a time.

5. The trolley of claim 4, wherein the sheave operates alone to support the entire weight of the trolley.

6. The trolley of claim 5, wherein at least one of the sheave and the first pad are adapted to fit a range of cable sizes by being shaped substantially in a V.

7. The trolley of claim 6, wherein the trimmer is adjustable by at least one of a top adjuster, a bottom adjuster, and both thereof.

8. The trolley of claim 7, wherein the exclusive force braking the trolley is applied by one of the group consisting of the carriage, the trimmer, both thereof, and neither thereof.

9. The system of claim 8, wherein the exclusive force is applied through at least one of the first pad, the second pad, and both thereof.

10. The trolley of claim 9, wherein the material of the first pad is a composite material formed of a fiber-reinforced, cured, phenolic resin.

11. A method of controlling a descent of a user, the method comprising:
   providing a frame having a first end, a second end, a rail extending from proximate the first end to proximate the second end, and a fulcrum spaced away from the first end toward the second end;
   providing a brake, comprising a first pad, connecting to the frame;
   providing a trimmer, having a second pad, positioned opposite the first pad;

the providing a trimmer, wherein the trimmer is selectively adjustable by a user riding the trolley to provide a substantially continual clamping force by the first pad against the cable;

providing a sheave mount connecting a sheave, rolling along the cable, to the fulcrum;

providing a carriage having a user mount and selectively traveling along the rail;

the providing a carriage, wherein the carriage is selectively positionable along the rail by the user;

providing a tether connecting from the carriage to the frame to selectively shift the weight of a user between the carriage and the frame;

the providing a brake, wherein the brake is dynamically controllable by a user, arbitrarily, by selectively moving the carriage toward the fulcrum, by distributing the effective weight of the user between the carriage directly and the tether;

selecting a first cable suspended between at least two points;

connecting the trolley to travel along the cable;

halting the trolley by setting the trimmer to brake the trolley with respect to the cable;

suspending a user from the carriage;

releasing the trolley to roll along the first cable, by re-adjusting the trimmer; and dynamically braking the trolley by shifting at least a portion of the weight of a user from the carriage to the tether.

12. The method of claim 11, further comprising halting the trolley and removing, by the user, the trolley from the first cable.

13. The method of claim 12, wherein the connecting the trolley to the first cable is completed substantially exclusively by the user.

14. The method of claim 13, further comprising moving the trolley downhill past an obstruction proximate the first cable and re-connecting the trolley to continue rolling along the first cable.

15. The method of claim 14, further comprising selecting a second cable distinct from the first cable and reconnecting the trolley to roll along the second cable.

16. The method of claim 15, wherein the first and second cables are of different sizes and at least one of the sheave and the first pad is shaped substantially as a V to operate with the different sizes.

17. A method comprising:
selecting a trolley supportable by catenaries held in suspension, the trolley comprising
a frame having first and second ends,
a fulcrum therebetween,
at least one sheave connected to support the frame proximate the fulcrum,
a sheave mount selectively openable to connect the at least one sheave on a first cable,
a brake comprising a pad positioned proximate the first end, and
a carriage operable to travel along the frame at least a portion of the distance between the second end and the fulcrum;

connecting the at least one sheave onto the first cable;

trimming the brake to render the trolley stationary with respect to the first cable;

suspending a user from the carriage;

trimming the brake to release the trolley to travel along the first cable;

controlling the speed of the travel, during the travel, by the user dynamically adjusting the brake;

the dynamically adjusting the brake, by the user during travel along the first cable;

opening the sheave mount, by the user; and removing the trolley from the first cable, by the user.

18. The method of claim 17, wherein the dynamically adjusting the brake further comprises at least one of:
shifting the user's weight between the carriage and the frame by pulling a tether drawing the carriage toward the fulcrum; and
adjusting the trimmer by the user during the travel along the first cable.

19. The method of claim 17, further comprising:
placing the trolley on a second cable distinct from the first cable;
securing the trolley to the second cable by closing the sheave mount;
trimming the brake to fix the trolley with respect to the second cable;
suspending the user from the carriage;
trimming the brake to release the trolley to travel along the second cable;
dynamically controlling the brake by shifting the weight of the user between the carriage and the tether.

20. The method of claim 17, wherein:
at least one of the pad and the at least one sheave is shaped to receive and operate on a plurality of sizes of the first and second cable;
dynamically controlling the braking comprises selecting by the user from the group consisting of adjusting the trimmer during the travel, shifting the weight of the user between the carriage and the tether during the travel, and both thereof.

* * * * *